(12) United States Patent
Ang et al.

(10) Patent No.: US 10,158,312 B2
(45) Date of Patent: Dec. 18, 2018

(54) MOTOR CONTROL APPARATUS

(71) Applicant: TOYOTA JIDOSHA KABUSHIKI KAISHA, Toyota-shi, Aichi-ken (JP)

(72) Inventors: Wanleng Ang, Gotemba (JP); Masaki Okamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 29 days.

(21) Appl. No.: 15/408,692

(22) Filed: Jan. 18, 2017

(65) Prior Publication Data
US 2017/0207739 A1 Jul. 20, 2017

(30) Foreign Application Priority Data

Jan. 20, 2016 (JP) .................................. 2016-008478
Nov. 10, 2016 (JP) .................................. 2016-219796

(51) Int. Cl.
*H02P 21/00* (2016.01)
*H02P 6/17* (2016.01)
*H02P 27/08* (2006.01)

(52) U.S. Cl.
CPC ............ *H02P 21/0021* (2013.01); *H02P 6/17* (2016.02); *H02P 21/0085* (2013.01); *H02P 27/08* (2013.01); *H02P 2205/05* (2013.01)

(58) Field of Classification Search
CPC ... H02P 21/0089; H02P 2207/03; B60K 1/02; B60K 6/26; B60K 6/48
USPC ......................................................... 318/494
See application file for complete search history.

(56) References Cited

U.S. PATENT DOCUMENTS

| 2009/0237019 A1* | 9/2009 | Yamakawa | H02P 23/04 318/400.09 |
|---|---|---|---|
| 2012/0306415 A1* | 12/2012 | Kawakami | H02P 6/10 318/400.23 |
| 2013/0063061 A1* | 3/2013 | Hanada | H02P 27/08 318/400.14 |
| 2014/0001990 A1* | 1/2014 | Takamatsu | H02P 27/08 318/400.22 |
| 2015/0280601 A1* | 10/2015 | Sakakibara | H02M 1/15 363/37 |

FOREIGN PATENT DOCUMENTS

JP 2013-187933 A 9/2013

* cited by examiner

*Primary Examiner* — Kawing Chan
*Assistant Examiner* — Bradley Brown
(74) *Attorney, Agent, or Firm* — Hunton Andrews Kurth LLP

(57) ABSTRACT

A motor control apparatus includes: a booster circuit electrically connected to a battery; and an inverter electrically connected to the booster circuit at one end and electrically connected to a motor at another end. The motor control apparatus is provided with a controller configured to control the inverter to output square wave voltage to the motor, thereby driving the motor. The controller is configured to control the inverter to temporarily invert voltage polarity associated with the square wave voltage, on the basis of a phase difference between a voltage command associated with the motor and an electric current associated with the motor, on condition that an operating point of the motor is in a resonance region, which is an operation area in which resonance is generated in the booster circuit.

3 Claims, 16 Drawing Sheets

FIG. 5
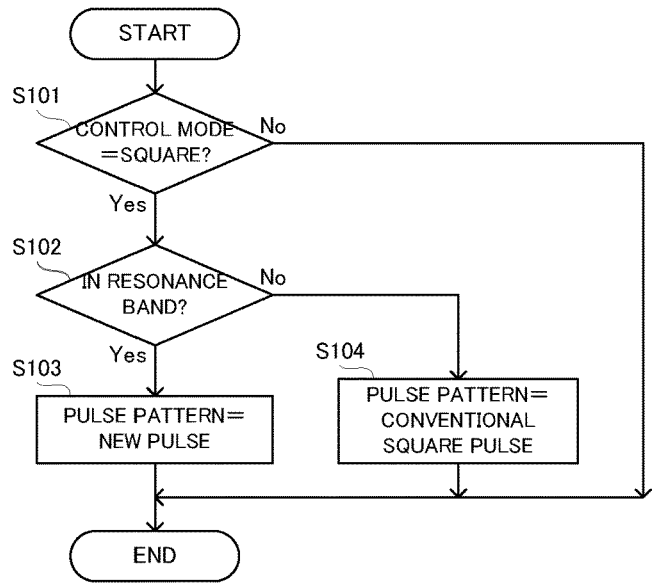
FIG. 6A
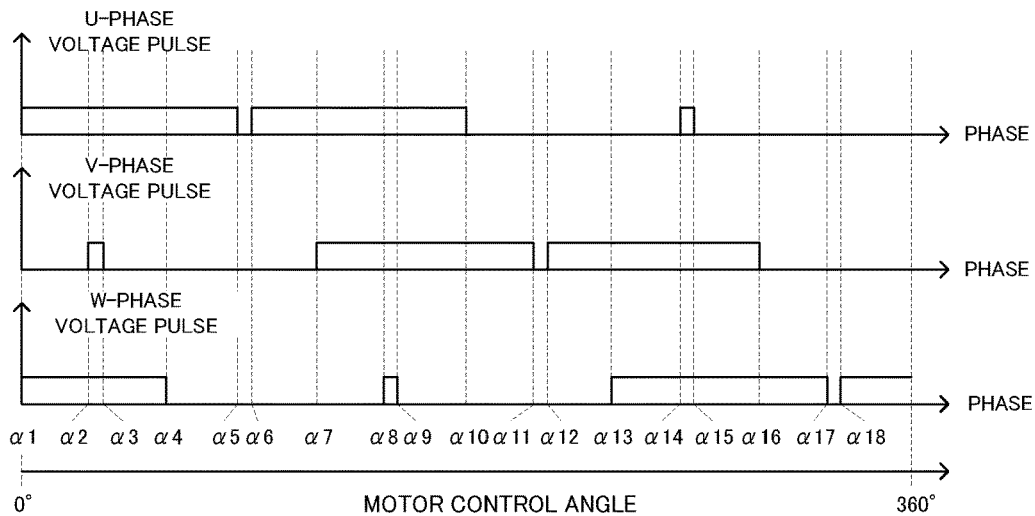
FIG. 6B
| 0 | α1 | 101 |
| 1 | α2 | 111 |
| 2 | α3 | 101 |
| ⋮ | ⋮ | ⋮ |

UPON REGENERATION

UPON POWER RUNNING
(MODIFIED EX)

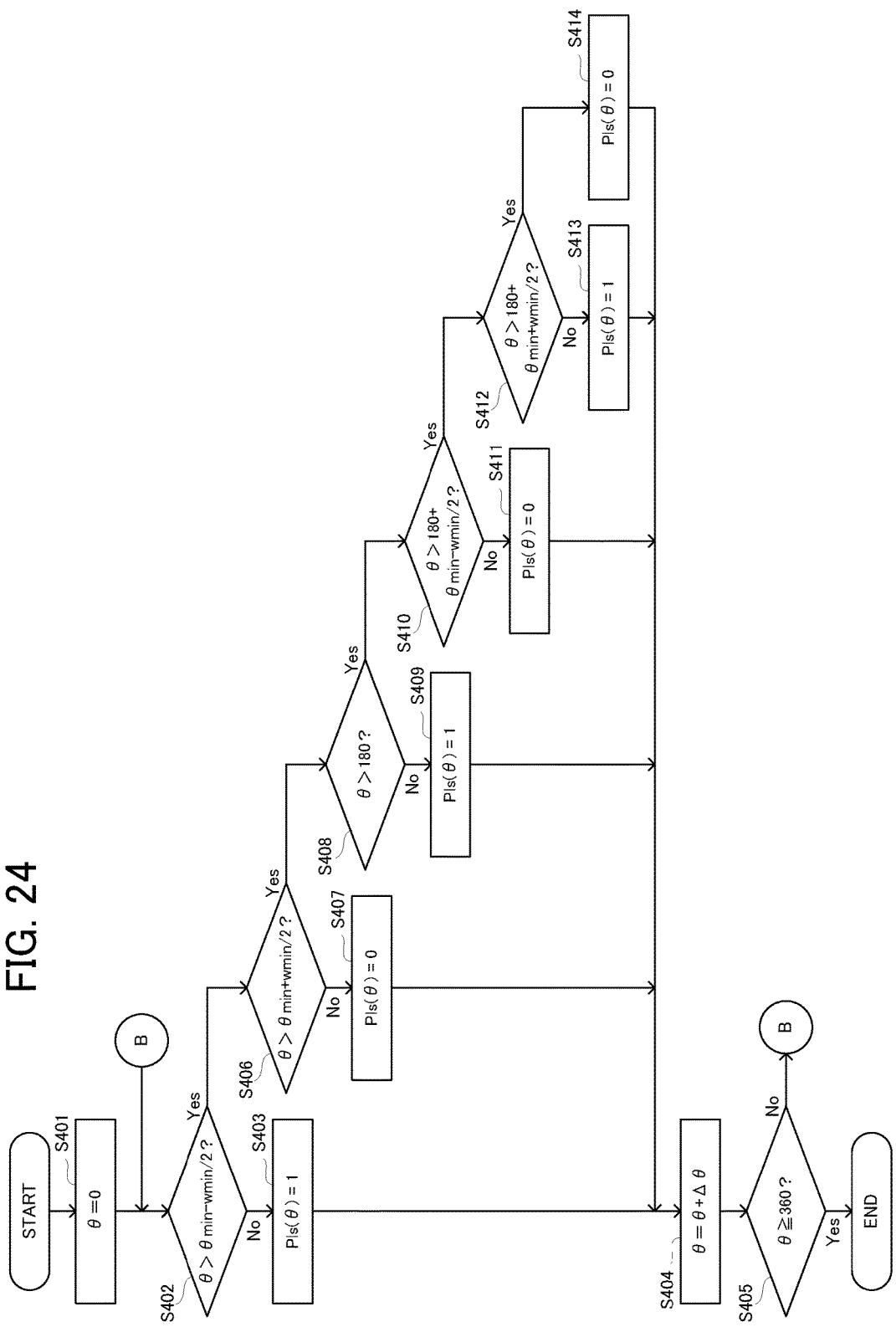

MOTOR CONTROL APPARATUS

CROSS-REFERENCE TO RELATED APPLICATIONS

This application is based upon and claims the benefit of priority of the prior Japanese Patent Application No. 2016-008478, filed on Jan. 20, 2016 and the prior Japanese Patent Application No. 2016-219796, filed on Nov. 10, 2016, the entire contents of which are incorporated herein by reference.

BACKGROUND OF THE INVENTION

1. Field of the Invention

Embodiments of the present invention relate to a motor control apparatus configured to control a motor.

2. Description of the Related Art

For this type of apparatus, there has been proposed an apparatus configured to switching-control an inverter, which is configured to supply electric power to a motor, by using a pulse width modulation (PWM) signal (refer to Japanese Patent Application Laid Open No. 2013-187933). The patent literature particularly describes that the number of pulses in one electrical cycle of the motor is generated on condition that switching frequency of the inverter and a motor current distortion rate are reduced, on the basis of a torque command and rotational frequency of the motor, and describes that the PWM signal synchronized with a voltage command is generated on the basis of the voltage command and the generated number of pulses.

Some apparatus of this type is provided with a booster circuit mounted between a battery and an inverter. The booster circuit includes a reactor and a capacitor, and the reactor and the capacitor constitute an LC circuit. Depending on an operating point of the motor, the LC circuit resonates (i.e. resonance is generated in the booster circuit). In the technology/technique described in the aforementioned patent literature, the resonance of the booster circuit is not taken into account, which is technically problematic.

SUMMARY

In view of the aforementioned problem, it is therefore an object of embodiments of the present invention to provide a motor control apparatus in which energy efficiency can be improved while suppressing the resonance of the booster circuit.

The above object of embodiments of the present invention can be achieved by a first motor control apparatus including: a booster circuit electrically connected to a battery; and an inverter electrically connected to the booster circuit at one end and electrically connected to a motor at another end, wherein the motor control apparatus is provided with a controller configured to control the inverter to output square wave voltage to the motor, thereby driving the motor, and the controller is configured to control the inverter to temporarily invert voltage polarity associated with the square wave voltage, on the basis of a phase difference between a voltage command associated with the motor and an electric current associated with the motor, on condition that an operating point of the motor is in a resonance region, which is an operation area in which resonance is generated in the booster circuit.

As described above, depending on the operating point of the motor, the resonance is generated in the booster circuit. Specifically, if the sixth component of the electrical frequency (or sixth electrical frequency) of driving power of the motor is in a predetermined frequency zone, which includes resonance frequency of a LC circuit of the booster circuit, then, the LC circuit resonates due to a harmonic of the driving power of the motor. This results in variation in boosted voltage, which is voltage supplied to the inverter from the booster circuit, and also results in variation in electric current outputted from the battery.

According to studies of the present inventors, it has been found that the sixth electrical frequency can be made higher by changing a shape of a square wave of the square wave voltage, which is outputted from the inverter to the motor, in predetermined timing (e.g. by further inverting a high level and a low level at 90 degrees and 270 degrees in a square wave in which the high level and the low level are inverted at intervals of 180 degrees, or by performing similar actions) when the resonance is generated in the booster circuit, and as a result, the generation of the resonance in the booster circuit can be avoided.

In the first motor control apparatus according to embodiments of the present invention, the inverter is controlled by the controller to temporarily invert the voltage polarity associated with the square wave voltage, on the basis of the phase difference between the voltage command associated with the motor and the electric current associated with the motor, on condition that the operating point of the motor is in the resonance region.

The shape of the original square wave (e.g. a square wave in which the voltage polarity is inverted at intervals of 180 degrees) is changed by temporarily inverting the voltage polarity associated with the square wave voltage. Thus, according to the motor control apparatus, the generation of the resonance in the booster circuit can be suppressed. In addition, in the motor control apparatus, the motor is driven by using the square wave voltage (i.e. the motor is driven by square wave control). It is thus possible to reduce a switching loss of the inverter and to improve energy efficiency, in comparison with the case of the motor driven by PWM control.

In particular, it has been found by the studies of the present inventors that the generation of the resonance in the booster circuit can be suppressed by controlling the inverter to temporarily invert the voltage polarity associated with the square wave voltage on the basis of the phase difference between the voltage command associated with the motor and the electric current associated with the motor.

The above object of embodiments of the present invention can be achieved by a second motor control apparatus including: a booster circuit electrically connected to a battery; and an inverter electrically connected to the booster circuit at one end and electrically connected to a motor, which includes a three-phase coil, at another end, wherein the motor control apparatus is provided with a controller configured to control the inverter to output square wave voltage to the motor, thereby driving the motor, the controller is configured to control the inverter to temporarily invert voltage polarity associated with the outputted square wave voltage, and the controller is configured to determine a voltage phase in which the voltage polarity associated with the outputted square wave voltage is to be temporarily inverted, and a voltage phase range in which the inversion is to be continued, on the basis of (i) a U-phase voltage waveform, a V-phase voltage waveform, and a W-phase voltage waveform, which are associated with the square wave voltage supplied to the motor, (ii) a U-phase current waveform, a V-phase current waveform, and a W-phase current waveform, which are associated with current supplied to the motor, and (iii) input voltage associated with the inverter.

Even in the second motor control apparatus, as in the first motor control apparatus described above, the inverter is controlled to temporarily invert the voltage polarity associated with the square wave voltage. It is thus possible to suppress the generation of the resonance in the booster circuit even if the operating point of the motor is in the resonance region. Even in the motor control apparatus, the motor is driven by the square wave control. It is thus possible to reduce the switching loss of the inverter and to improve the energy efficiency, in comparison with the case of the motor driven by PWM control.

According to the studies of the present inventors, it has been found that it is possible to appropriately determine the voltage phase in which the voltage polarity associated with the square wave voltage is to be inverted and the voltage phase range in which the inversion is to be continued, from the U-phase voltage waveform, the V-phase voltage waveform, the W-phase voltage waveform, the U-phase current waveform, the V-phase current waveform, the W-phase current waveform, and the input voltage associated with the inverter (refer to a fourth embodiment described later regarding specific determination methods).

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 5 is a flowchart illustrating a pulse pattern determination process according to the first embodiment;

FIG. 6A and FIG. 6B are diagrams illustrating one example of a new pulse pattern according to the first embodiment;

FIG. 24 is a flowchart illustrating a pulse pattern determination process according to the fourth embodiment.

DETAILED DESCRIPTION OF THE PREFERRED EMBODIMENTS

A motor control apparatus according to embodiments of the present invention will be explained with reference to the drawings. In the following embodiments, for example, a motor control apparatus configured to control a driving motor of a hybrid vehicle or an electric vehicle is exemplified for the motor control apparatus according to embodiments of the present invention. The motor as a control target of the motor control apparatus is a three-phase alternating current (AC) motor, and is configured to have both functions of an electric motor and a generator.

The motor control apparatus according to the embodiments is provided with a booster circuit mounted between a battery and an inverter. In the motor control apparatus according to the embodiments, the inverter is controlled to change a shape of a square wave of square wave voltage supplied to the motor in predetermined timing. Specifically, the inverter is controlled to temporarily invert voltage polarity associated with the square wave voltage in predetermined timing. As a result, sixth electrical frequency of motor driving power is made higher, by which the generation of resonance in the booster circuit can be avoided.

First Embodiment

A motor control apparatus according to a first embodiment of the present invention will be explained with reference to FIG. 1 to FIG. 7. Hereinafter, firstly, a configuration of the motor control apparatus and an outline of a motor control operation will be explained. Then, a new pulse pattern will be explained.

(Configuration of Apparatus)

Figure 1:
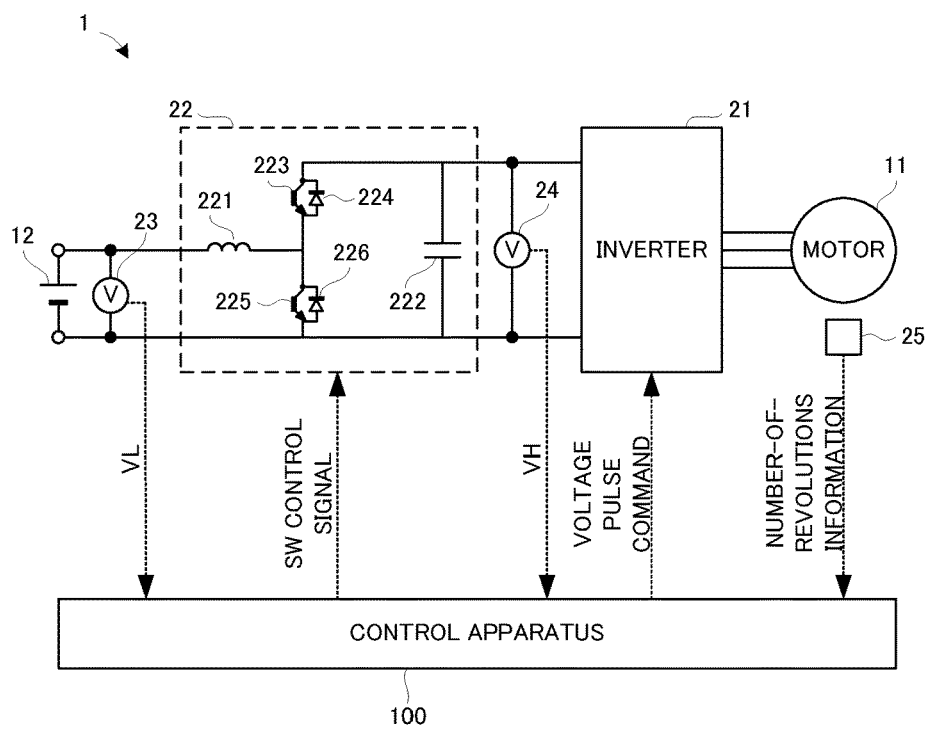
FIG. 1 is a schematic block diagram illustrating a configuration of a motor control apparatus according to a first embodiment.

The configuration of the motor control apparatus according to the first embodiment will be explained with reference to FIG. 1. FIG. 1 is a schematic block diagram illustrating the configuration of the motor control apparatus according to the first embodiment.

In FIG. 1, a motor control apparatus 1 is provided with: an inverter 21 configured to convert direct current (DC) power outputted from a battery 12, such as, for example, a secondary battery, to alternating current (AC) power, and configured to supply the AC power to a motor 11; a booster circuit 22 mounted between the battery 12 and the inverter 21; and a control apparatus 100 configured to control the inverter 21 and the booster circuit 22.

The inverter 21 includes six transistors as switching elements, and six anti-parallel diodes respectively corresponding to the six transistors. An explanation of the details of the inverter 21 will be omitted because various existing aspects can be applied to the inverter 21.

The booster circuit 22 includes a reactor 221, a smoothing capacitor 222, an upper-arm transistor 223, an upper-arm diode 224, a lower-arm transistor 225, and a lower-arm diode 226.

An emitter of the transistor 223 and a collector of the transistor 225 are electrically connected to each other, and are also electrically connected to the reactor 221 at one end. The reactor 221 is electrically connected to a positive electrode of the battery 12 at the other end. A collector of the transistor 223 is electrically connected to a power supply line of the inverter 21. An emitter of the transistor 225 is electrically connected to an earth line of the inverter 21 and a negative electrode of the battery 12. Between the power supply line of the inverter 21 and the earth line, the smoothing capacitor 222 is electrically connected.

In operation of the motor control apparatus 1, both the transistors 223 and 225 are switching-controlled, by which voltage of the DC power (or voltage VL before boosting) outputted from the battery is boosted to predetermined voltage (or boosted voltage VH) and is supplied to the inverter 21 by the booster circuit 22. Moreover, if both the transistors 223 and 225 are switching-controlled, voltage of regenerative power from the inverter 21 is dropped by the booster circuit 22. Therefore, the battery 12 can be also charged with the regenerative power.

The voltage VL before boosting is detected by a voltage sensor 23 and is transmitted to the control apparatus 100. The boosted voltage VH is detected by a voltage sensor 24, which is electrically connected between terminals of the smoothing capacitor 222, and is transmitted to the control apparatus 100.

(Motor Control Operation)

Figure 2:
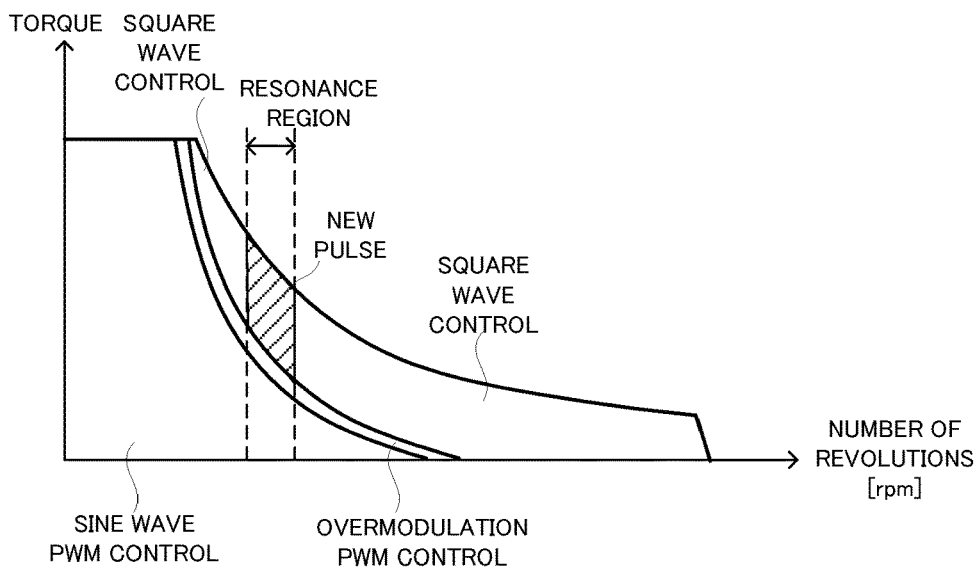
FIG. 2 is one example of a setting map for setting a control mode of a motor according to the first embodiment.

The motor control operation performed in the motor control apparatus 1 configured in the above manner will be explained with reference to FIG. 2 in addition to FIG. 1. FIG. 2 is one example of a setting map for setting a control mode of the motor according to the first embodiment.

The control apparatus 100 is configured to switching-control the inverter 21 and the booster circuit 22 in such a manner that the motor 11 outputs torque in accordance with a torque command value Trqcom in a method described later, on the basis of the torque command value Trqcom inputted from a not-illustrated electronic control unit for vehicle control, which is mounted in the exterior, the voltage VL before boosting detected by the voltage sensor 23, the boosted voltage VH detected by the voltage sensor 24, motor currents iv and iw respectively detected by current sensors 26v and 26w (refer to FIG. 4), and a rotation angle θ of the motor 11 detected by a rotation detector 25, such as, for example, a resolver and a hall element.

The control apparatus 100 is configured to calculate target boosted voltage on the basis of the torque command value Trqcom or the like, and to control the boost circuit 22 in such a manner that the boosted voltage VH matches the calculated target boosted voltage.

In the motor control apparatus 1, there are three control modes for voltage conversion of the inverter 21. Specifically, as illustrated in FIG. 2, as the control mode, there are a square wave PWM control method using square wave PWM voltage, an overmodulation PWM control method using overmodulation PWM voltage, and a sine wave control method using sine wave voltage.

The control apparatus 100 is configured to calculate motor required voltage (i.e. induced voltage) from the torque command value Trqcom and the number of revolutions of the motor 11. The control apparatus 100 is configured to determine which method to use to control the motor 11, out of the square wave control method, the sine wave PWM control method, and the overmodulation PWM control method, in accordance with a relation between the motor required voltage and a maximum value of the boosted voltage VH (i.e. a maximum value of system voltage) (specifically, by determining whether or not modulation degree is greater than 0.78).

Which method to use out of the square wave control method, the sine wave PWM control method, and the overmodulation PWM control method is determined in accordance with a modulation degree range of voltage command values, which follow vector control.

The control mode is determined in this manner, by which smooth output characteristics can be obtained while suppressing torque variation in a low rotational speed area, and output of the motor 11 can be improved in a middle-high rotational speed area.

(Problem Caused by Booster Circuit)

The motor control operation performed in the motor control apparatus 1 as configured above will be explained with reference to FIG. 2 in addition to FIG. 1. FIG. 2 is one example of a setting map for setting a control mode of the motor according to the first embodiment.

The booster circuit 22 includes the reactor 221 and the smoothing capacitor 222, as illustrated in FIG. 1. The reactor 221 and the smoothing capacitor 222 constitute an LC circuit. Resonance frequency fr (center frequency) of the LC circuit can be expressed as $fr = \frac{1}{2}\{2\sqrt{(LC)}\}$ by using reactance L of the reactor 221 and capacitance C of the smoothing capacitor 222.

The LC circuit is configured not to resonate only at the center frequency, but to resonate in a certain degree of range of frequencies (fr (lower limit) to fr (upper limit)) centered on the center frequency. Here, fr (lower limit) is determined by minimum values of the reactance L and the capacitance C at which the LC circuit resonates. On the other hand, fr (upper limit)) is determined by maximum values of the reactance L and the capacitance C at which the LC circuit resonates. The minimum value and the maximum value of the reactance L and the minimum value and the maximum value of the capacitance C at which the LC circuit resonates are set in advance as circuit constants.

Depending on the operating point of the motor 11, sixth electrical frequency of driving power of the motor 11 is in the range of fr (lower limit) to fr (upper limit)) in some cases. In this case, the LC circuit that constitutes the booster circuit 22 resonates due to a harmonic of the driving power of the motor 11. This results in variation in the boosted voltage VH, and also results in variation in electric current outputted from the battery 12.

(Resonance Avoiding Method of Booster Circuit)

Figure 3A:
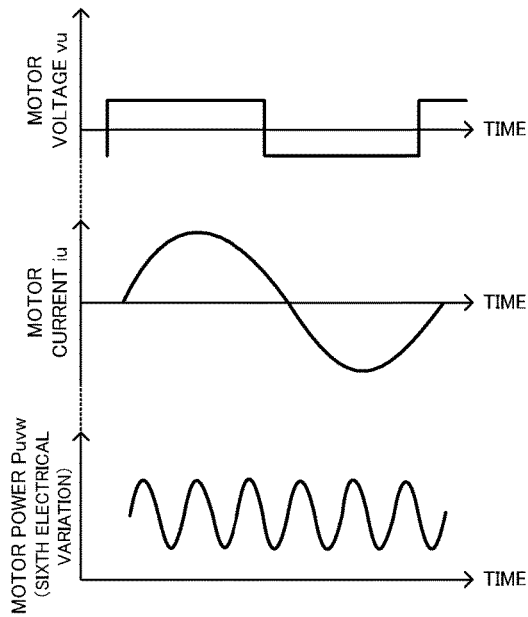
FIG. 3A is a diagram illustrating one example of time variation of motor voltage, motor current, and motor power when resonance is generated in a booster circuit.
Figure 3B:
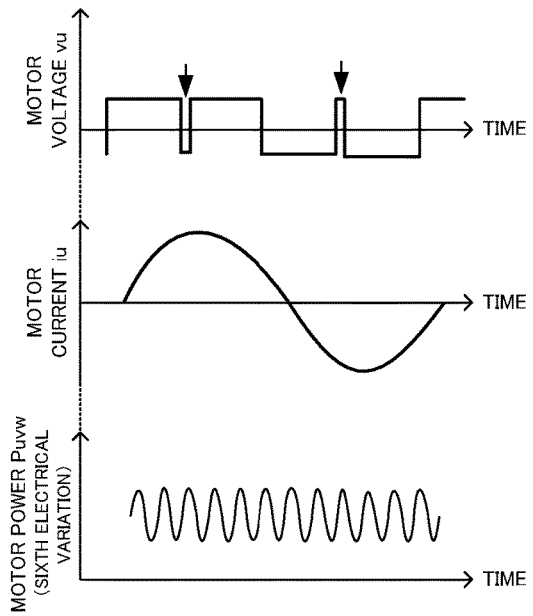
FIG. 3B is a diagram illustrating one example of time variation of the motor voltage, the motor current, and the motor power when the resonance is not generated in the booster circuit.

The present inventors have found that if the shape of the square wave of the square wave voltage outputted from the inverter 21 to the motor 11 is changed in predetermined timing (refer to arrows in "MOTOR VOLTAGE" in FIG. 3B), the sixth electrical frequency of the driving power of the motor 11 can be made higher (refer to "MOTOR POWER" in FIG. 3B). As a result, the sixth electrical frequency deviates from the range of fr (lower limit) to fr (upper limit)), and thus, resonance of the LC circuit that constitutes the booster circuit 22 can be avoided.

In the first embodiment, when the motor 11 is controlled in the square wave control method, the shape of the square wave of the square wave voltage is changed (i.e. the voltage polarity associated with the square wave voltage is temporarily inverted) on condition that the operating point of the motor 11 is in a resonance region, which is an operation area in which the resonance is generated in the booster circuit 22, and the sixth electrical frequency of the driving power of the motor 11 is made higher.

(Square Wave Control Method)

The control for avoiding the resonance in the booster circuit 22 described above is based on the square wave control method. Firstly, with reference to FIG. 4, an explanation will be given to the motor control operation when the motor 11 is controlled in the square wave control method.

The control apparatus 100 is provided with a three-phase/dq-phase converter 101, a torque estimator 102, a subtractor 103, a proportional-integral (PI) controller 104, a phase limiter 105, and a pulse generator 106, as logical processing blocks or physical processing circuits realized therein, in order to perform the motor control operation in the square wave control method.

The three-phase/dq-phase converter 101 is configured to convert the V-phase current iv and the W-phase current iw respectively detected by the current sensors 26v and 26w, to a d-axis current id and a q-axis current iq, with reference to the rotation angle θ of the motor 11 detected by the rotation detector 25.

The torque estimator 102 is configured to estimate output torque Trq of the motor 11 on the basis of the d-axis current id and the q-axis current iq. An explanation of the details of a method of estimating the output torque Trq will be omitted because various existing methods can be applied.

The subtractor 103 is configured to obtain a torque deviation ΔTrq (=Trqcom−Trq) from the torque command value Trqcom and the output torque Trq. The PI controller 104 is configured to perform PI arithmetic operation using a predetermined gain regarding the torque deviation ΔTrq, thereby obtaining a control deviation, and is configured to set a phase φ of the square wave voltage in accordance with the obtained control deviation. In other words, the PI controller 104 is configured to perform torque feedback control.

Specifically, if the torque command value Trqcom is positive, the PI controller 104 is configured to advance a voltage phase when torque is insufficient, and is configured to delay the voltage phase when the torque is excessive. On the other hand, if the torque command value Trqcom is negative, the PI controller 104 is configured to delay the voltage phase when the torque is insufficient, and is configured to advance the voltage phase when the torque is excessive.

The phase limiter 105 is configured to determine whether or not the voltage phase φ set by the PI controller 104 is in a predetermined range (e.g. in a range in which an amount of change from the previous voltage phase does not cause a shock). If the voltage phase φ is in the predetermined range, the phase limiter 105 is configured to supply the voltage phase φ to the pulse generator 106. On the other hand, if the voltage phase φ is not in the predetermined range, the phase limiter 105 is configured to supply the voltage phase φ corresponding to an upper limit value of the predetermined range, to the pulse generator 106.

The pulse generator 106 is configured to generate voltage command values of three phases (i.e. a U-phase voltage command value, a V-phase voltage command value, and a W-phase voltage command value), on the basis of the voltage phase φ supplied from the phase limiter 105 and the rotation angle θ of the motor 11 detected by the rotation detector 25. Then, the pulse generator 106 is configured to output voltage pulse command values (refer to FIG. 1) to the inverter 21, which are switching control signals for switching-controlling the inverter 21, on the basis of the generated voltage command values of the three phases.

(Pulse Pattern Determination Method)

The control apparatus 100 is further provided with a pulse pattern determinator 107. The pulse pattern determinator 107 is configured to determine whether or not the voltage pulse command values generated by the pulse generator 106 follow a pulse pattern that does not allow the resonance in the booster circuit 22 (hereinafter referred to as a "new pulse pattern" as occasion demands). The "pulse pattern" herein means a pattern that defines a relation between the voltage command values and the voltage phases of the three phases (in other words, a pattern that defines changes of the voltage command values with respect to the voltage phases).

A pulse pattern determination method of the pulse pattern determinator 107 will be explained with reference to a flowchart in FIG. 5. A process explained below is repeatedly performed with a predetermined period by the pulse pattern determinator 107 of the control apparatus 100.

In FIG. 5, the pulse pattern determinator 107 determines whether or not a current control mode is the square wave control method (step S101). As a result of the determination, if it is determined that the current control mode is not the square wave control method (the step S101: No), the pulse pattern determinator 107 ends the process. In this case, the motor control apparatus 1 controls the motor 11 in the sine wave PWM control method or the overmodulation PWM control method.

On the other hand, as a result of the determination, if it is determined that the current control mode is the square wave control method (the step S101: Yes), the pulse pattern determinator 107 determines whether or not the operating point of the motor 11 is in the resonance region (i.e. determines whether or not the sixth electrical frequency of the driving power of the motor 11 is in the frequency range of fr (lower limit) to fr (upper limit) in which the LC circuit that constitutes the booster circuit 22 resonates) (step S102). The sixth electrical frequency can be expressed as N/60×(the number of counter electrodes of the motor 11) by using the number of revolutions N (rpm: revolutions/min) of the motor 11.

As a result of the determination in the step S102, if it is determined that the operating point of the motor 11 is in the resonance region (the step S102: Yes), the pulse pattern determinator 107 controls the pulse generator 106 to generate the voltage pulse command values that follow the new pulse pattern (step S103).

On the other hand, as a result of the determination in the step S102, if it is determined that the operating point of the motor 11 is not in the resonance region (the step S102: No), the pulse pattern determinator 107 controls the pulse generator 106 to generate the voltage pulse command values in the conventional square wave control method (i.e. the voltage pulse command values that do not take into account the resonance of the booster circuit 22) (step S104).

(New Pulse Pattern)

Figure 7:
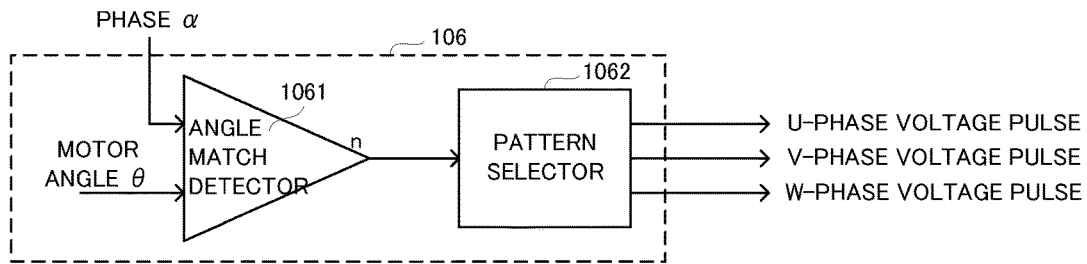
FIG. 7 is a diagram for explaining operations of a pulse generator according to the first embodiment.

One example of a method of generating the voltage pulse command values that follow the new pulse pattern in the pulse generator 106 will be explained with reference to FIG. 6A to FIG. 7. FIG. 6A and FIG. 6B are diagrams illustrating one example of the new pulse pattern. FIG. 7 is a diagram for explaining operations of the pulse generator according to the first embodiment.

As explained in the "Square Wave Control Method" described above, the pulse generator 106 is supplied with the voltage phase φ and the rotation angle θ. Then, the pulse generator 106 is configured to generate the voltage pulse command values from the voltage command values of the three phases based on the voltage phase φ and the rotation angle θ.

For the generation of the voltage pulse command values that follow the new pulse pattern, however, a table may be prepared and used in which the voltage pulse command values are determined in accordance with the rotation angle θ.

FIG. 6A illustrates one example of waveforms of the three phases associated with the new pulse pattern. Specifically, a U-phase voltage pulse has a waveform having a square wave in which a high level and a low level are inverted at a rotation angle θ of 180 degrees and in which the high level and the low level are further temporarily inverted near rotation angles θ of 90 degrees and 270 degrees. A V-phase voltage pulse has a waveform in which a phase of the waveform of the U-phase voltage pulse is delayed by 120 degrees. A W-phase voltage pulse has a waveform in which the phase of the waveform of the U-phase voltage pulse is delayed by 240 degrees (or is advanced by 120 degrees).

Now, the waveforms illustrated in FIG. 6A are expressed with numerical values and with a high level of "1" and a low level of "0". For example, in the case of a phase α1 (or a rotation angle θ of 0 degrees), they are "101" in order of a U-phase, a V-phase, and a W-phase. As described above, a table illustrated in FIG. 6B is established by associating the phase (or the rotation angle θ) with the waveform. "0, 1, 2, and so on" in FIG. 6B are referential numerals corresponding to the phase.

The pulse generator 106 includes an angle match detector 1061 and a pattern selector 1062 as logical processing blocks or physical processing circuits realized therein (refer to FIG. 7).

The angle match detector 1061 is configured to output a reference numeral n corresponding to a matched phase if the rotation angle θ of the motor 11 detected by the rotation detector 25 matches any phase included in the table. Specifically, for example, if the rotation angle θ matches a phase α3, the angle match detector 1061 outputs a reference numeral "2" (refer to FIG. 6B).

The pattern selector 1062 is configured to obtain a pattern of the three phases from the table on the basis of the reference numeral n outputted from the angle match detector 1061, and is configured to generate the voltage pulse command values. Specifically, for example, if the reference numeral "2" is outputted from the angle match detector 1061, the pattern selector 1062 obtains a pattern "101" from the table. Then, the pattern selector 1062 generates the voltage pulse command values corresponding to the high level as U-phase and W-phase voltage pulse command values, and generates the voltage pulse command value corresponding to the low level as a V-phase voltage pulse command value.

The pattern selector 1062 is configured to generate the voltage pulse command values based on the reference numeral n previously outputted, until a new reference numeral n is outputted from the angle match detector 1061. In other words, the pattern selector 1062 is configured to generate the voltage pulse command values on the basis of a reference numeral "0" corresponding to the phase α1 until the rotation angle θ matches, for example, the phase α1 and then matches a phase α2.

The inverter 21 is switching-controlled by using the voltage pulse command values, by which the voltage polarity associated with the square wave voltage supplied to the motor 11 is temporarily inverted in predetermined timing. Specifically, for example, in the case of U-phase voltage, in timing in which the rotation angle θ of the motor 11 matches a phase α5, the voltage polarity associated with the square wave voltage is inverted from positive polarity to negative polarity. In timing in which the rotation angle θ of the motor 11 matches a phase α6, the voltage polarity associated with the square wave voltage is inverted again from negative polarity to positive polarity.

(Effects)

In the motor control apparatus 1 according to the first embodiment, if the operating point of the motor 11 is in the resonance region in which the resonance is generated in the booster circuit 22, the voltage pulse command values that follow the new pulse pattern are generated. The inverter 21 is switching-controlled in accordance with the generated voltage pulse command values, by which the sixth electrical frequency of the driving power of the motor 11 is made higher. As a result, the generation of the resonance in the booster circuit 22 can be avoided.

In the first embodiment, the new pulse pattern is realized on the basis of the square wave control method. It is thus possible to improve energy efficiency while suppressing a switching loss of the inverter 21, in comparison with the square wave PWM control method and the overmodulation PWM control method.

Modified Example

Figure 8:
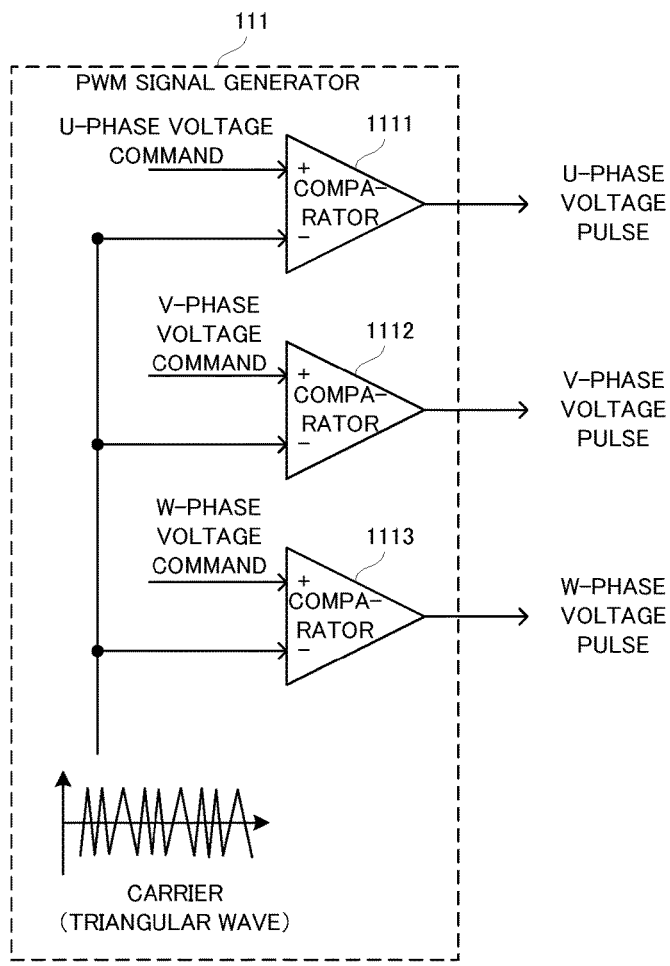
FIG. 8 is a diagram for explaining operations of a PWM signal generator according to a modified example of the first embodiment.
Figure 9:
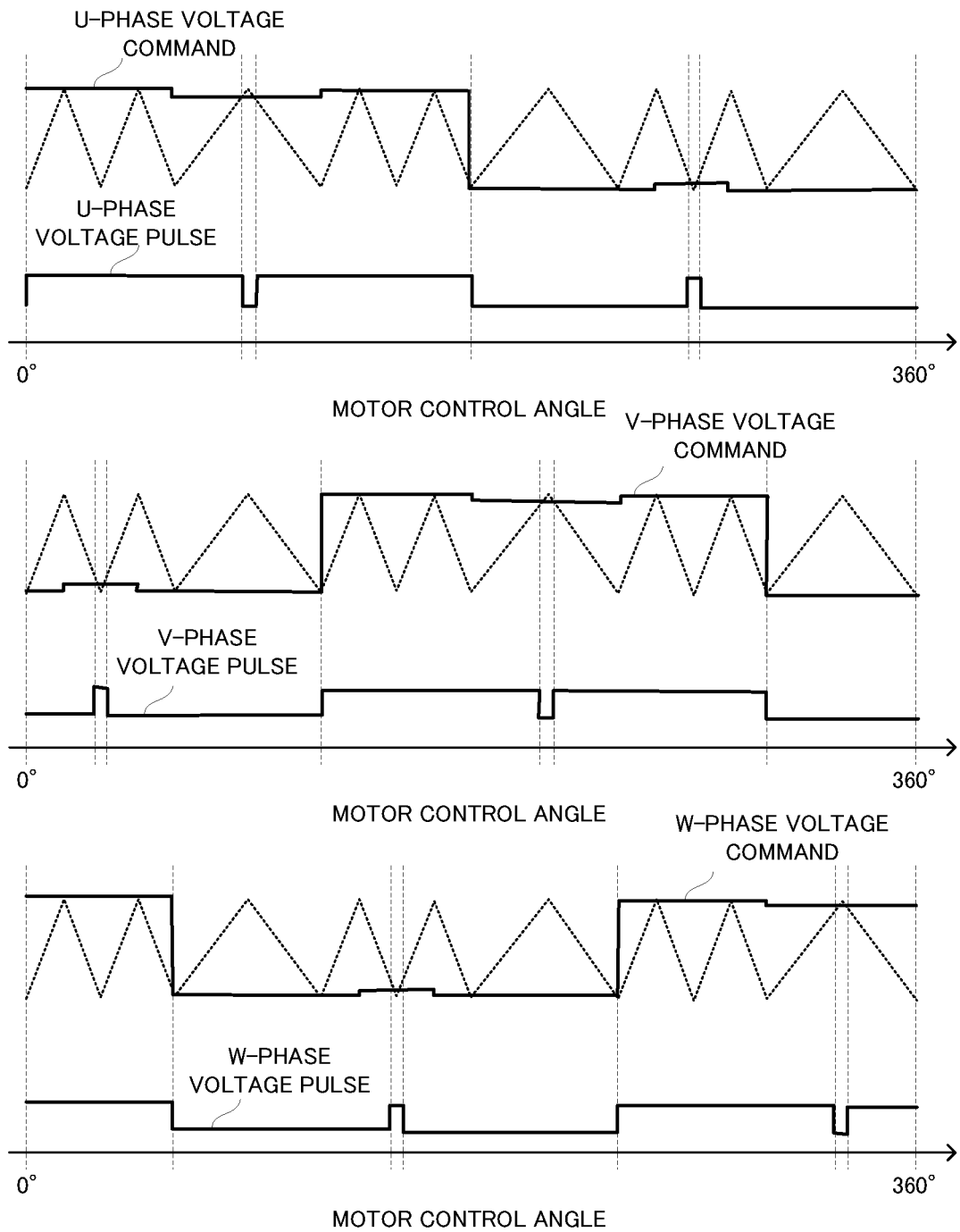
FIG. 9 is a diagram illustrating one example of a new pulse pattern according to the modified example of the first embodiment.

Next, a modified example of the first embodiment will be explained with reference to FIG. 8 and FIG. 9. FIG. 8 is a diagram for explaining operations of a PWM signal generator according to the modified example of the first embodiment. FIG. 9 is a diagram illustrating one example of a new pulse pattern according to the modified example of the first embodiment.

The aforementioned first embodiment is based on the square wave control method; however, in the modified example, a new pulse pattern is realized on the basis of a PWM control method. An operation of the details of a control operation of the motor 11 in the PWM control method will be omitted because various existing aspects can be applied to the control operation. Here, with reference to FIG. 8 and FIG. 9, an explanation will be given only to the operations of a PWM signal generator 111, which is provided for the control apparatus 100 as a logical processing block or a physical processing circuit realized therein, in order to control the motor 11 in the PWM control method.

The PWM signal generator 111 according to the modified example realizes PWM control in a triangular wave comparison method (refer to FIG. 8). The PWM signal generator 111 includes a comparator 1111 configured to generate the U-phase voltage pulse, a comparator 1112 configured to generate the V-phase voltage pulse, and a comparator 1113 configured to generate the W-phase voltage pulse. The same carrier (or triangular wave) is inputted to each of the comparators 1111, 1112, and 1113.

If a U-phase voltage command, a V-phase voltage command, and a W-phase voltage command with such waveforms as illustrated in FIG. 9 are respectively inputted to the comparators 1111, 1112, and 1113 as modulated waves, the same pulse waveforms as those of the new pulse pattern illustrated in FIG. 6A are generated (refer to "U-PHASE VOLTAGE PULSE", "V-PHASE VOLTAGE PULSE", and "W-PHASE VOLTAGE PULSE" in FIG. 9).

As described above, appropriate selection of the waveforms of the modulated waves and the carrier makes it possible to realize the new pulse pattern by which the generation of the resonance can be avoided in the booster circuit 22, even in the PWM control method.

Second Embodiment

A motor control apparatus according to a second embodiment of the present invention will be explained with reference to FIG. 10 to FIG. 12B. In the first embodiment, a phase difference between the voltage and the current of the motor 11 (i.e. a power factor) is set as a fixed value (specifically, a phase difference of zero). The second embodiment is the same as the aforementioned first embodiment, except that the pulse waveforms associated with the new pulse pattern are determined in view of the power factor. Thus, in the second embodiment, the same explanation as that in the first embodiment will be omitted, and the same parts on the drawings will carry the same reference numerals. Basically, only a different point will be explained with reference to FIG. 10 to FIG. 12B.

Figure 10:
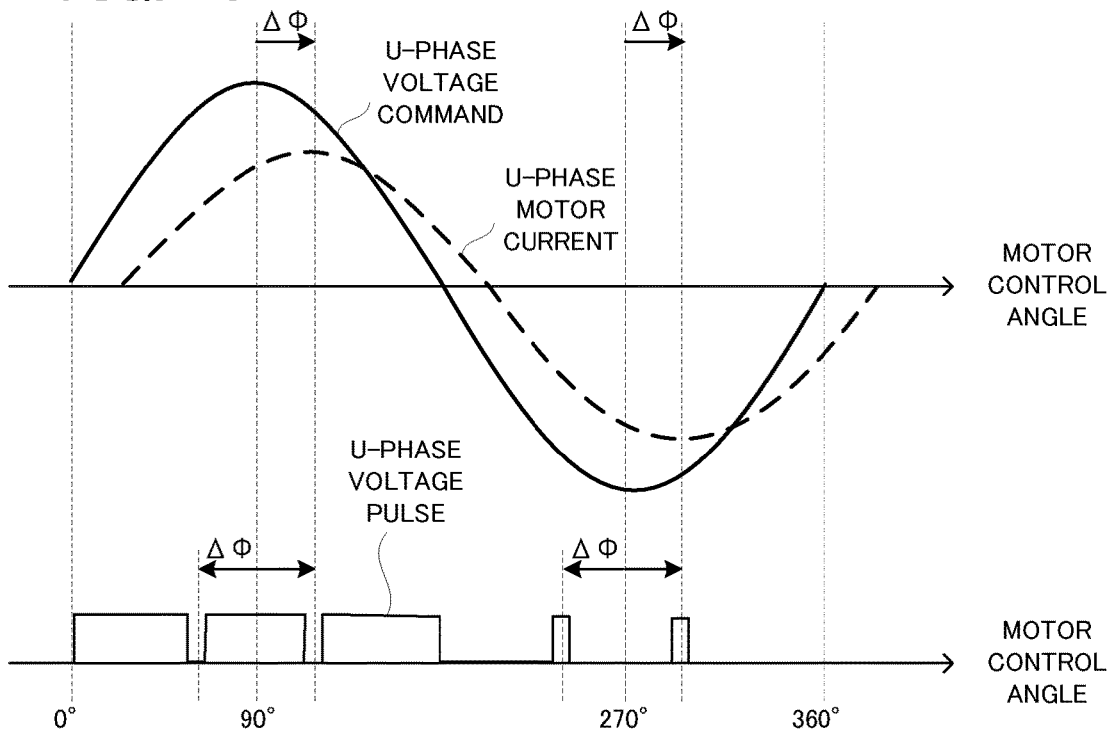
FIG. 10 is a conceptual diagram illustrating a concept of a new pulse pattern according to a second embodiment.
Figure 11:
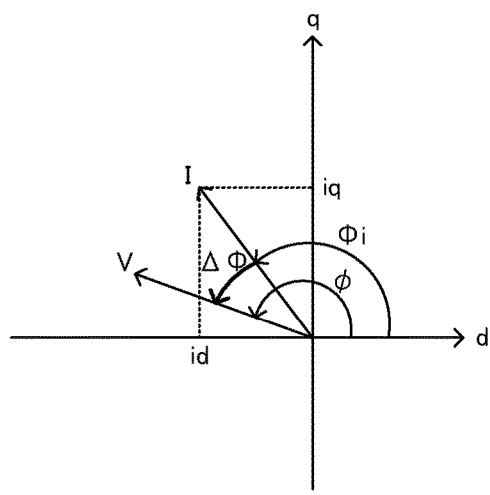
FIG. 11 is a conceptual diagram illustrating a concept of phase relation detection according to the second embodiment.
Figures 12A, 12B:
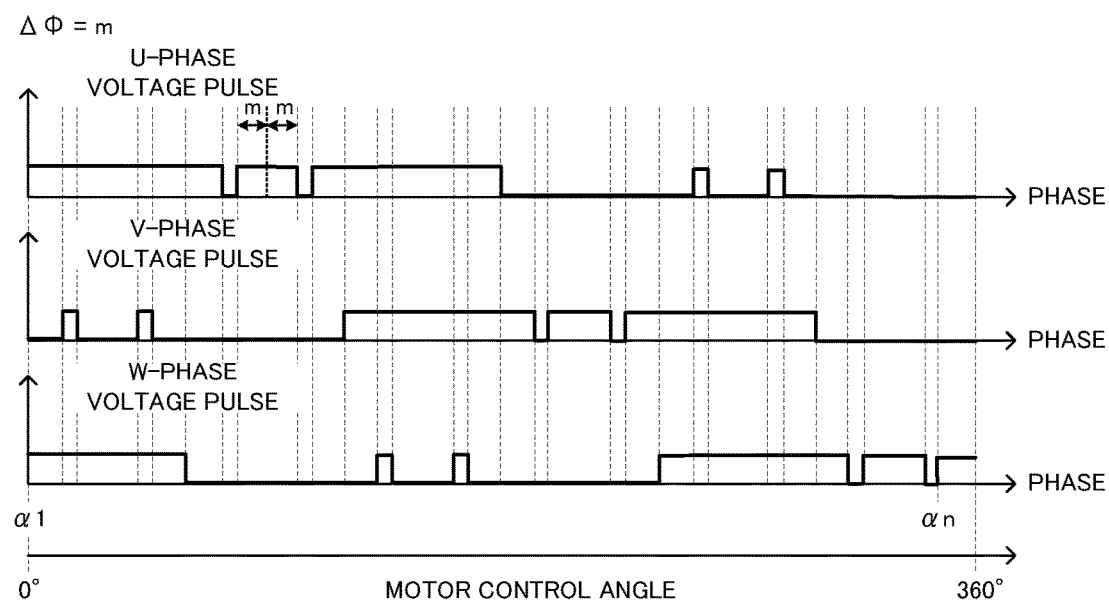
FIG. 12A and FIG. 12B are diagrams illustrating one example of the new pulse pattern according to the second embodiment.

FIG. 10 is a conceptual diagram illustrating a concept of a new pulse pattern according to the second embodiment. FIG. 11 is a conceptual diagram illustrating a concept of phase relation detection according to the second embodiment. FIG. 12A and FIG. 12B are diagrams illustrating one example of the new pulse pattern according to the second embodiment.

(New Pulse Pattern)

It is assumed that, for example, the U-phase voltage command (i.e. the U-phase voltage pulse) associated with square wave control is expressed by sine waves illustrated in FIG. 10, for convenience. If a phase difference $\Delta\Phi$ between the voltage of the motor 11 (or the U-phase voltage command herein) and a U-phase current of the motor 11 is zero, i.e. if the power factor is 1, regarding the U-phase, the pulse pattern illustrated in FIG. 6A in which the high level and the low level are inverted near the rotation angles θ of the motor 11 of 90 degrees and 270 degrees is determined as the new pulse pattern.

On the other hand, if the phase difference $\Delta\Phi$ is not zero, and if the voltage polarity associated with the square wave voltage is temporarily inverted in accordance with a peak of the U-phase current of the motor 11, power variation of the motor 11 can be suppressed, which has been found by the present inventors. In this case, in order to maintain 90-degree symmetry of the waveform of the U-phase voltage supplied to the motor 11, the voltage polarity associated with the square wave voltage is temporarily inverted even in timing in which the phase is advanced (or delayed) by the phase difference $\Delta\Phi$ from the peak of the U-phase voltage command. Thus, regarding the U-phase, the pulse pattern illustrated in the lower part of FIG. 10 is determined as the new pulse pattern.

Figure 4:
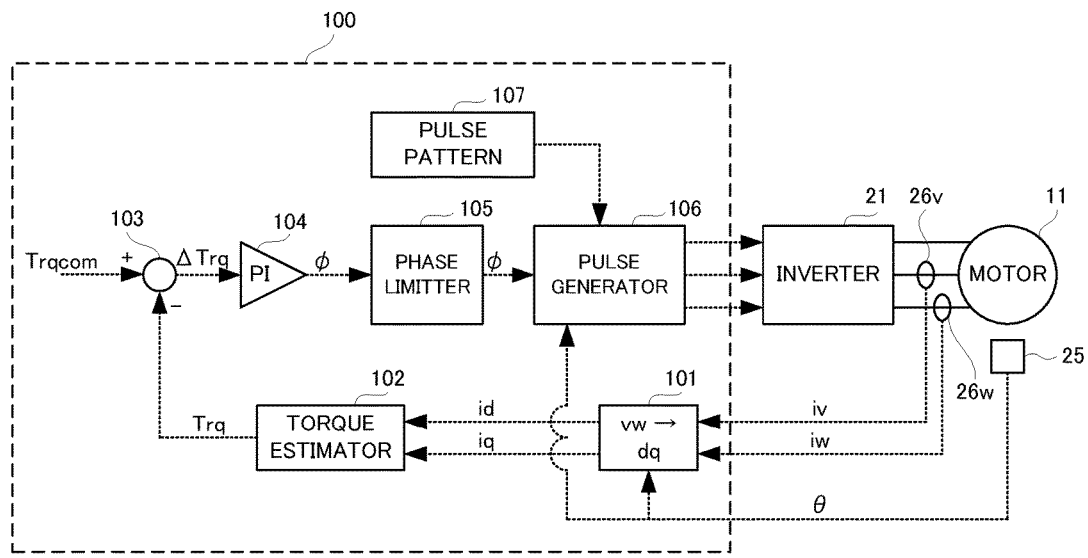
FIG. 4 is a control block diagram illustrating one example of motor control in a square wave control method according to the first embodiment.

The pulse generator 106 according to the second embodiment (refer to FIG. 4) is configured to obtain the phase difference $\Delta\Phi$ on the basis of the voltage phase $\Phi$ supplied from the phase limiter 105 (refer to FIG. 4) and the d-axis current id and the q-axis current iq converted by the three-phase/dq-phase converter 101 (refer to FIG. 4). Specifically, as illustrated in FIG. 11, it is assumed that, in dq coordinates, the rotation angle from a d-axis of a current vector I, which is expressed by the d-axis current id and the q-axis current iq, is set as the voltage phase $\Phi$. The pulse generator 106 is configured to obtain the phase difference $\Delta\Phi$ (=$\Phi$−$\Phi$i) from the voltage phase $\Phi$ and a current phase $\Phi$i.

FIG. 12A illustrates one example of the waveforms of the three phases associated with the new pulse pattern when the phase difference $\Delta\Phi$ is "m". By expressing the waveforms illustrated in FIG. 12A with numerical values and with the high level of "1" and the low level of "0", a table (or a table for determining the voltage pulse command values in accordance with the rotation angle θ of the motor 11) with the phase difference $\Delta\Phi$ of "m" is established (refer to FIG. 12B).

In the second embodiment, a plurality of tables corresponding to a plurality of phase differences $\Delta\Phi$ established in this manner are stored in advance in the pulse generator 106.

The pulse generator 106 is configured to firstly obtain the phase difference $\Delta\Phi$ as described above if the motor control apparatus 1 controls the motor 11 in the square wave control method and if the pulse generator 106 is controlled by the pulse pattern determinator 107 to generate the voltage pulse command values that follow the new pulse pattern.

The pulse generator 106 is then configured to select the table corresponding to the obtained phase difference $\Delta\Phi$. The angle match detector 1061 of the pulse generator 106 (refer to FIG. 8) is then configured to output a reference numeral n corresponding to a matched phase if the rotation angle θ of the motor 11 detected by the rotation detector 25 matches any phase included in the selected table.

The pattern selector 1062 of the pulse generator 106 (refer to FIG. 8) is then configured to obtain a pattern of the three phases from the selected table on the basis of the reference numeral n outputted from the angle match detector 1061, and is configured to generate the voltage pulse command values (Effects)

In the new pulse pattern that takes into account the power factor, the temporary inversion of the voltage polarity associated with the square wave voltage is performed in timing in which the power variation of the motor 11 has a peak. As a result, the power variation of the motor 11 is suppressed, and the sixth electrical frequency of the driving power of the motor 11 is made higher. Therefore, according to the motor control apparatus 1 according to the second embodiment, it is possible to avoid the generation of the resonance in the booster circuit 22 while suppressing the power variation of the motor 11.

The "control apparatus 100" according to the second embodiment is one example of the "controller" according to embodiments of the present invention.

Third Embodiment

Figures 13A, 13B:
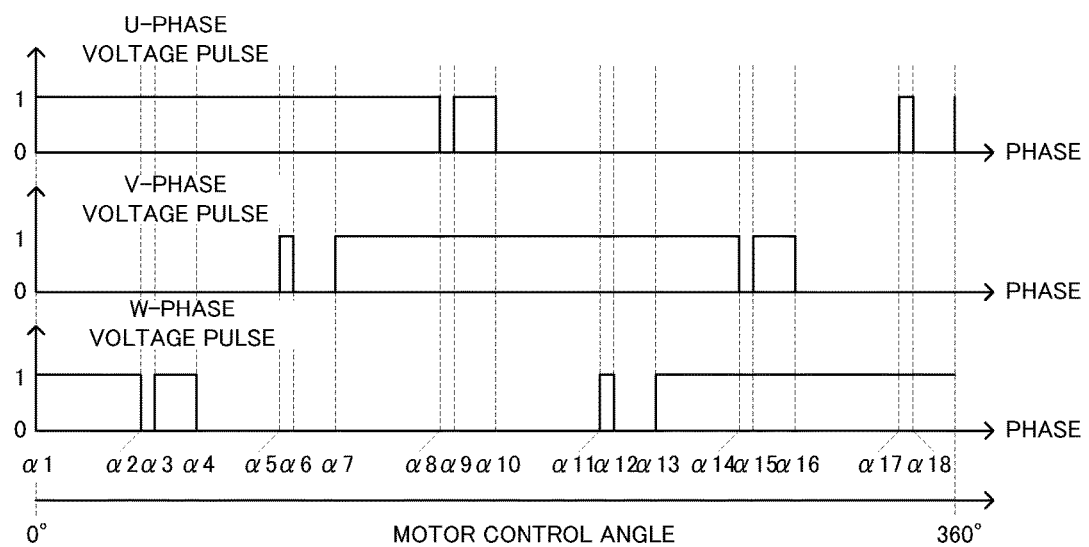
FIG. 13A and FIG. 13B are diagrams illustrating one example of a new pulse pattern upon power running according to a third embodiment.

A motor control apparatus according to a third embodiment of the present invention will be explained with reference to FIG. 13A to FIG. 15B. The third embodiment is the same as the aforementioned first embodiment, except that the pulse waveforms associated with the new pulse pattern are determined on the basis of operation aspects of the motor 11 (specifically, on the basis of power running or regeneration). Thus, in the third embodiment, the same explanation as that in the first embodiment will be omitted, and the same parts on the drawings will carry the same reference numerals. Basically, only a different point will be explained with reference to FIG. 13A to FIG. 15B. FIG. 13A and FIG. 13B are diagrams illustrating one example of a new pulse pattern upon power running according to the third embodiment.

(New Pulse Pattern)

(1) Upon Power Running

If the motor 11 is controlled to output the driving power (i.e. upon power running), for example, a pulse pattern illustrated in FIG. 13A is determined as the new pulse pattern. Specifically, the U-phase voltage pulse has a waveform having the square wave in which the high level and the low level are inverted at a rotation angle $\theta$ of 180 degrees and in which the high level and the low level are further temporarily inverted near rotation angles $\theta$ of 162 degrees and 342 degrees. The V-phase voltage pulse has a waveform in which the phase of the waveform of the U-phase voltage pulse is delayed by 120 degrees. The W-phase voltage pulse has a waveform in which the phase of the waveform of the U-phase voltage pulse is delayed by 240 degrees (or is advanced by 120 degrees).

By expressing the waveforms of the voltage pulses of the three phases illustrated in FIG. 13A with numerical values and with the high level of "1" and the low level of "0", a table (or a table for determining the voltage pulse command values in accordance with the rotation angle $\theta$ of the motor 11) upon power running is established (refer to FIG. 13B).

The pulse generator 106 is configured to select the table corresponding to the power running if the motor control apparatus 1 controls the motor 11 to output the driving power in the square wave control method and if the pulse generator 106 is controlled by the pulse pattern determinator 107 to generate the voltage pulse command values that follow the new pulse pattern. The angle match detector 1061 of the pulse generator 106 (refer to FIG. 8) is then configured to output a reference numeral n corresponding to a matched phase if the rotation angle $\theta$ of the motor 11 detected by the rotation detector 25 matches any phase included in the selected table.

The pattern selector 1062 of the pulse generator 106 (refer to FIG. 8) is then configured to obtain a pattern of the three phases from the selected table on the basis of the reference numeral n outputted from the angle match detector 1061, and is configured to generate the voltage pulse command values.

Figure 14A:
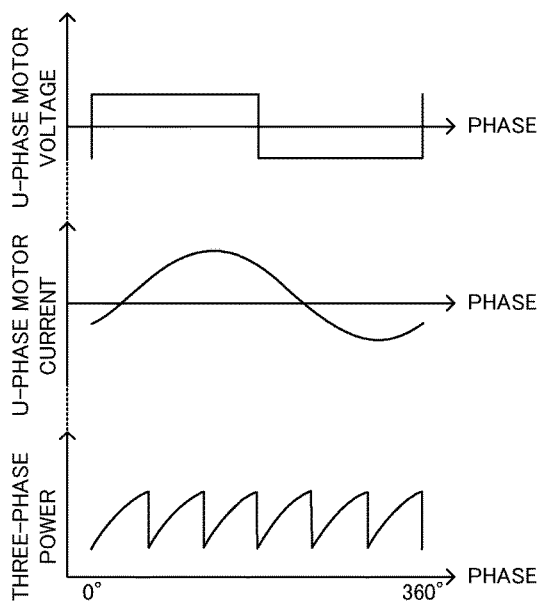
FIG. 14A is a diagram illustrating one example of one cycle of waveforms of the motor voltage, the motor current, and the motor power when the motor is controlled in accordance with a conventional square wave pulse pattern.
Figure 14B:
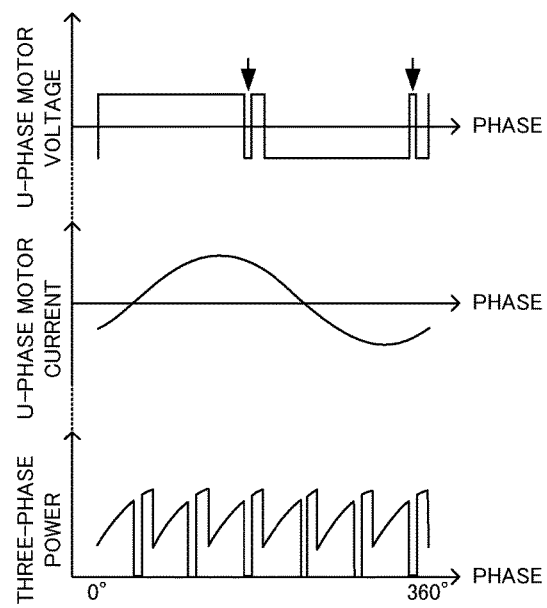
FIG. 14B is a diagram illustrating one example of one cycle of waveforms of the motor voltage, the motor current, and the motor power when the motor is controlled in accordance with the new pulse pattern.

Now, a waveform associated with three-phase power when the motor 11 is controlled in accordance with the pulse pattern illustrated in FIG. 13A will be explained with reference to FIG. 14A and FIG. 14B. The waveform associated with the three-phase power means a waveform obtained by superimposing power waveforms of the three phases. FIG. 14A is a diagram illustrating one example of one cycle of the waveforms of the motor voltage, the motor current, and the motor power when the motor 11 is controlled in accordance with a conventional square wave pulse pattern. FIG. 14B is a diagram illustrating one example of one cycle of the waveforms of the motor voltage, the motor current, and the motor power when the motor 11 is controlled in accordance with the new pulse pattern.

In comparison with the "three-phase power" in FIG. 14A and the "three-phase power" in FIG. 14B, it is clear that there are notches in crests of the waveform associated with the three-phase power due to the temporary inversion of the voltage polarity associated with the square wave voltage outputted from the inverter 21 (refer to arrows of the "motor voltage" in FIG. 14B) if the motor 11 is controlled in accordance with the new pulse pattern (refer to FIG. 14B). The reason why there are six notches is that the temporary inversion of the voltage polarity occurs twice in the motor voltage of each phase, and thus, the temporary inversion of the voltage polarity occurs six times in total in the three phases.

It has been found by studies of the present inventors that the following result is obtained if harmonic analysis is performed on each of the waveform illustrated in the "three-phase power" in FIG. 14A and the waveform illustrated in the "three-phase power" in FIG. 14B. In other words, a sixth component of the electrical frequency is much smaller when the motor 11 is controlled in accordance with the new pulse pattern than when the motor 11 is controlled in the conventional square wave control method. On the other hand, 12-th and 18-th components of the electrical frequency are larger when the motor 11 is controlled in accordance with the new pulse pattern than when the motor 11 is controlled in the conventional square wave control method. In other words, by that the motor 11 is controlled in accordance with the new pulse pattern, the sixth component of the electrical frequency with the waveform associated with the three-phase power is made higher.

(2) Upon Regeneration

Figure 15A:
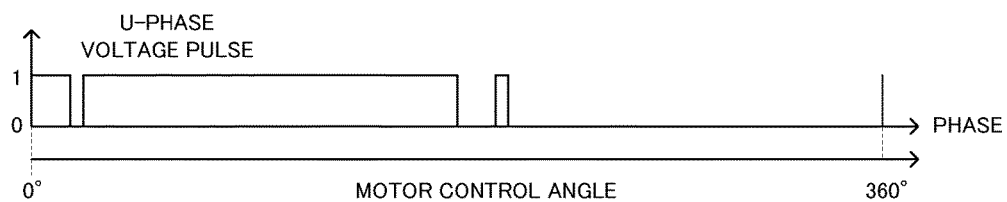
FIG. 15A is a diagram illustrating one example of a new pulse pattern upon regeneration according to the third embodiment.

If regeneration is performed in the motor 11, for example, a pulse pattern illustrated in FIG. 15A is determined as the new pulse pattern. Specifically, the U-phase voltage pulse has a waveform having the square wave in which the high level and the low level are inverted at a rotation angle $\theta$ of 180 degrees and in which the high level and the low level are further temporarily inverted near rotation angles $\theta$ of 18 degrees and 198 degrees. The V-phase voltage pulse has a not-illustrated waveform in which the phase of the waveform of the U-phase voltage pulse is delayed by 120 degrees. The W-phase voltage pulse has a not-illustrated waveform in which the phase of the waveform of the U-phase voltage pulse is delayed by 240 degrees (or is advanced by 120 degrees).

(3) Upon Power Running (Modified Example)

Figure 15B:
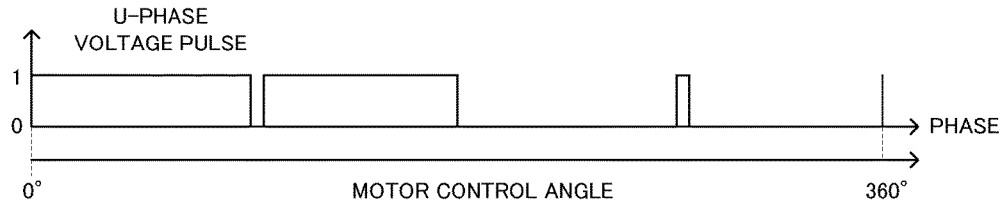
FIG. 15B is a diagram illustrating another example of the new pulse pattern upon power running according to the third embodiment.

If the motor 11 is controlled to output the driving power, for example, a pulse pattern illustrated in FIG. 15B may be determined as the new pulse pattern. Specifically, the U-phase voltage pulse has a waveform having the square wave in which the high level and the low level are inverted at a rotation angle $\theta$ of 180 degrees and in which the high level and the low level are further temporarily inverted near rotation angles $\theta$ of 102 degrees and 282 degrees. The V-phase voltage pulse has a not-illustrated waveform in which the phase of the waveform of the U-phase voltage pulse is delayed by 120 degrees. The W-phase voltage pulse has a not-illustrated waveform in which the phase of the waveform of the U-phase voltage pulse is delayed by 240 degrees (or is advanced by 120 degrees).

(How to Experimentally Obtain New Pulse Pattern)

An explanation will be given to one example of how to experimentally obtain the pulse patterns illustrated in FIG. 13A to FIG. 15B. Hereinafter, in the waveform of the U-phase voltage pulse illustrated in FIG. 13A, a phase corresponding to a phase α8 in which the high level is inverted to the low level at the rotation angle θ of less than or equal to 180 degrees is referred to as a "start position θs1", and a phase corresponding to a phase α9 in which the low level is inverted again to the high level at the rotation angle θ of less than or equal to 180 degrees is referred to as an "end position θe1". A phase α17 and a phase α18 in the waveform of the U-phase voltage pulse illustrated in FIG. 13A are respectively expressed as "θs1+180" and "θe1+180". Moreover, for the V-phase voltage pulse and the W-phase voltage pulse, the start position θs1 and the end position θe1 obtained for the U-phase voltage pulse may be shifted by 120 degrees or 240 degrees.

Firstly, a search range of the start position θs1 and the end position θe1 is set while the rotation angle θ is less than or equal to 180 degrees. A difference between an upper limit and a lower limit of the search range is desirably less than or equal to 30 degrees. Then, a three-phase voltage waveform and a three-phase current waveform are obtained by an actual machine while both of the start position θs1 and the end position θe1 are changed in the set search range. At this time, a difference between the start position θs1 and the end position θe1 is desirably set to be constant.

Then, the waveform associated with the three-phase power is obtained for each combination of the start position θs1 and the end position eel from the obtained three-phase voltage waveform and the obtained three-phase current waveform, and the harmonic analysis is performed on the obtained waveform associated with the three-phase power. Then, as a result of the harmonic analysis, a combination of the start position θs1 and the end position θe1 in which the electrical frequency has the smallest sixth component is determined as an optimum start position θsmin and an optimum end position θemin.

By repeating the aforementioned procedure for each of a plurality of operating points of the motor 11 defined by the number of revolutions and the torque, the new pulse pattern corresponding to each operating point of the motor 11 can be obtained.

(Effects)

According to the motor control apparatus 1 in the third embodiment, particularly, an optimum pulse pattern according to the operation aspects of the motor 11 is selected as the new pulse pattern. It is thus possible to avoid the generation of the resonance in the booster circuit 22. In addition, in the third embodiment, the new pulse pattern is realized on the basis of the square wave control method. It is thus possible to improve the energy efficiency while suppressing the switching loss of the inverter 21, in comparison with the square wave PWM control method and the overmodulation PWM control method.

Fourth Embodiment

A motor control apparatus according to a fourth embodiment of the present invention will be explained with reference to FIG. 16 to FIG. 24. The fourth embodiment is the same as the aforementioned third embodiment, except that the pulse waveforms associated with the new pulse pattern are obtained in a different manner. Thus, in the fourth embodiment, the same explanation as that in the third embodiment will be omitted, and the same parts on the drawings will carry the same reference numerals. Basically, only a different point will be explained with reference to FIG. 16 to FIG. 24.

(How to Obtain New Pulse Pattern)

Firstly, an outline of how to obtain the new pulse pattern will be explained, and then, the details of each process will be explained.

(1) Outline

Figure 16:
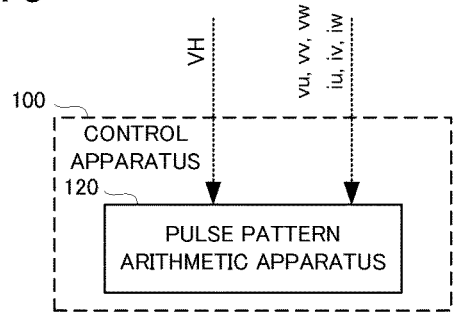
FIG. 16 is a block diagram illustrating a main part of a control apparatus according to a fourth embodiment.

Firstly, an outline of how to obtain the pulse waveforms associated with the new pulse pattern according to the fourth embodiment will be explained with reference to FIG. 17. Here, a control apparatus 100 according to the fourth embodiment is provided with a pulse pattern arithmetic apparatus (hereinafter referred to as an "arithmetic apparatus") 120, as a logical processing block or a physical processing circuit realized therein, as illustrated in FIG. 16.

Figure 17:
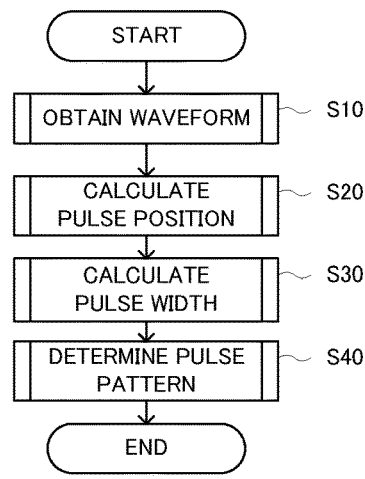
FIG. 17 is a flowchart illustrating an outline of a new pulse pattern determination process according to the fourth embodiment.

In FIG. 17, the arithmetic apparatus 120 obtains the waveform associated with the three-phase power (step S10). The, the arithmetic apparatus 120 calculates, as a pulse position, a voltage phase in which the voltage polarity associated with the square wave voltage is to be temporarily inverted, on the basis of the obtained waveform associated with the three-phase power (step S20). The "pulse position" according to the fourth embodiment means a center value of a voltage phase range in which the voltage polarity is temporarily inverted, unlike that in the aforementioned third embodiment (e.g. refer to "θmin" in FIG. 23).

Then, the arithmetic apparatus 120 calculates, as a pulse width, a voltage phase range in which the temporary inversion of the voltage polarity is to be continued, on the basis of the calculated pulse position or the like (step S30). Lastly, the arithmetic apparatus 120 determines the pulse waveforms associated with the new pulse pattern, on the basis of the calculated pulse position and the calculated pulse width (step S40).

(2) Waveform Obtaining Process

The details of the process operation in the step S10 will be explained with reference to a flowchart in FIG. 18.

Figure 18:
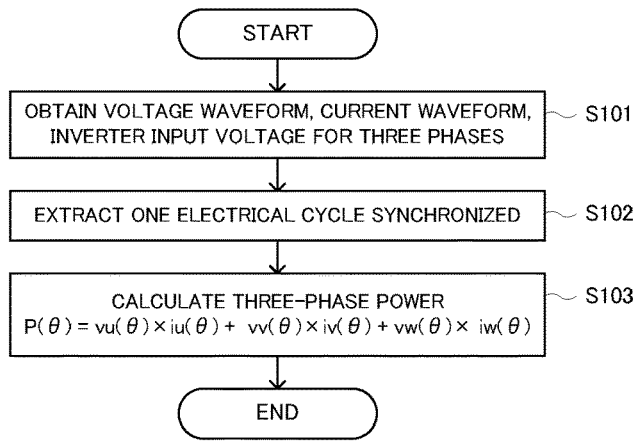
FIG. 18 is a flowchart illustrating a waveform acquisition process according to the fourth embodiment.

In FIG. 18, the arithmetic apparatus 120 obtains voltage waveforms and current waveforms of the three phases (i.e. the U-phase, the V-phase, and the W-phase), and obtains input voltage of the inverter 21 (i.e. the boosted voltage VH) (step S101). The obtained voltage waveforms and the obtained current waveforms of the three phases are waveforms obtained by actual measurement or simulations regarding a certain operating point of the motor 11, wherein the motor 11 is controlled in the conventional square wave control method, or in accordance with the new pulse pattern obtained in advance.

Then, the arithmetic apparatus 120 extracts at least synchronized one cycle of the voltage waveforms and the current waveforms, from the obtained voltage waveforms and the obtained current waveforms of the three phases (step S102). Here, the extracted voltage waveforms and the extracted current waveforms of the three phases are expressed in the following manner; namely, a U-phase voltage waveform is vu(θ), a U-phase current waveform is iu(θ), a V-phase voltage waveform is vv(θ), a V-phase current waveform is iv(θ), a W-phase voltage waveform is vw(θ), and a W-phase current waveform is iw(θ). Here, it is assumed that θ satisfies a relation of "0≤θ≤360".

Then, the arithmetic apparatus 120 calculates the waveform associated with the three-phase power on the basis of the voltage waveforms and the current waveforms of the three phases (step S103). Here, if the waveform associated with the three-phase power is P(θ), the waveform P(θ) is expressed as P(θ)=vu(θ)×iu(θ)+vv(θ)×iv(θ)+vw(θ)×iw(θ).

(3) Pulse Position Calculation Process

The details of the process operation in the step S20 described above will be explained with reference to a flowchart in FIG. 19.

Figure 19:
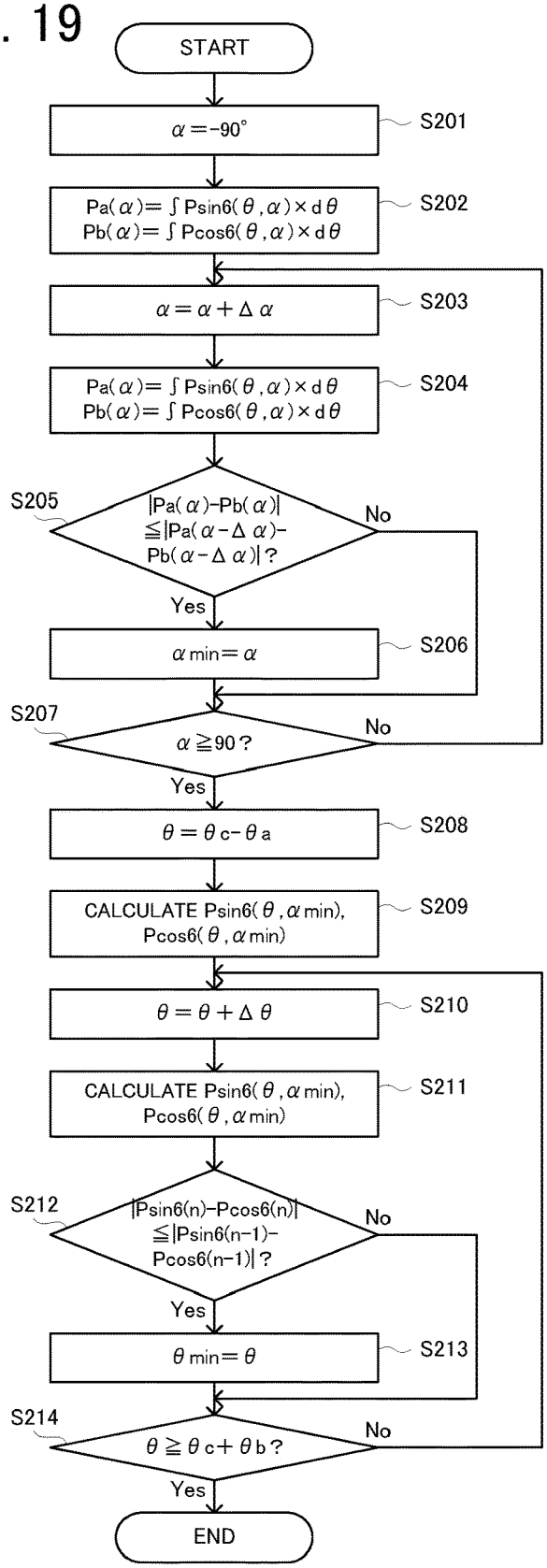
FIG. 19 is a flowchart illustrating a pulse position calculation process according to the fourth embodiment.

In FIG. 19, the arithmetic apparatus 120 sets a phase α to "−90", which is an initial value (step S201). Then, the arithmetic apparatus 120 obtains "P(θ)×sin(6θ+α)" as "P sin 6(θ, α)" (i.e. P sin 6(θ, α)=P(θ)×sin(6θ+α)), on the basis of the waveform P(θ). Moreover, the arithmetic apparatus 120 obtains "P(θ)×cos(6θ+α)" as "P cos 6(θ, α)" (i.e. P cos 6(θ, α)=P(θ)×cos(6θ+α)).

Then, the arithmetic apparatus 120 integrates P sin 6(θ, α) and P cos 6(θ, α) regarding θ between 0 and 360, and obtains Pa(α)(=∫P sin 6(θ, α)×dθ) and Pb(α)(=∫P cos 6(θ, α)×dθ) (step S202).

Then, the arithmetic apparatus 120 increases the phase α by Δα (step S203), and obtains Pa(α) and Pb(α) for a new phase α, as in the process operation in the step S202 described above (step S204).

Then, the arithmetic apparatus 120 determines whether or not an absolute value of Pa(α)−Pb(α) is less than or equal to an absolute value of Pa(α−Δα)−Pb(α−Δα), on the basis of Pa(α) and Pb(α) currently obtained in the process operation in the step S204 and Pa(α−Δα)−Pb(α−Δα) obtained in the previous process (i.e. the process operation in the step S202, or the previous process operation in the step S204), wherein the previous phase α is referred to as "α−Δα" for convenience, because the phase α is updated every time, as illustrated in the step S203 in FIG. 18 (step S205).

In the determination in the step S205, if it is determined that the absolute value of Pa(α)−Pb(α) is greater than the absolute value of Pa(α−Δα)−Pb(α−Δα) (the step S205: No), a process operation in a step S207 described later is performed.

On the other hand, in the determination in the step S205, if it is determined that the absolute value of Pa(α)−Pb(α) is less than or equal to the absolute value of Pa(α−≠α)−Pb(α−Δα) (the step S205: Yes), the arithmetic apparatus 120 stores the present phase α as αmin (step S206).

Then, the arithmetic apparatus 120 determines whether or not the phase α is greater than or equal to 90 degrees (step S207). In the determination, it is determined that the phase α is less than 90 degrees (step S207; No), the process operation in the step S203 described above is performed.

On the other hand, in the determination in the step S207, it is determined that the phase α is greater than or equal to 90 degrees (step S207; Yes), the arithmetic apparatus 120 sets "θc−θa", which is an initial value (step S208). "θa", "θb", and "θc" described later are constants. "θa", "θb", and "θc" are values for defining a change range of θ in process operations after a step S209 described later. Specifically, θ changes in a range of θc−θa to θc+θa".

Then, the arithmetic apparatus 120 obtains P sin 6(θ, αmin) (=P(θ)×sin(6θ+αmin)) and P cos 6(θ, αmin) (=P(θ)×cos(6θ+αmin)) (step S209).

Then, the arithmetic apparatus 120 increases θ by Δθ (step S210) and obtains P sin 6(θ, αmin) and P cos 6(θ, αmin) for new θ, as in the process operation in the step S209 described above (step S211).

Then, the arithmetic apparatus 120 determines whether or not an absolute value of P sin 6(θ, αmin)−P cos 6(θ, αmin) is less than or equal to an absolute value of P sin 6(θ−Δθ, αmin)−P cos 6 (θ−Δθ, αmin), on the basis of P sin 6(θ, αmin) and P cos 6(θ, αmin) currently obtained in the process operation in the step S211 and P sin 6(θ−Δθ, αmin) and P cos 6 (θ−Δθ, αmin) obtained in the previous process (i.e. the process operation in the step S209, or the process operation in the step S211 previously performed), wherein the previous θ is referred to as "θ−Δθ" for convenience, because θ is updated every time, as illustrated in the step S210 in FIG. 18 (step S212).

In FIG. 18, for convenience, "P sin 6(θ, αmin)−P cos 6(θ, αmin)" is referred to as "P sin 6(n)−P cos 6(n)", and "P sin 6(θ−Δθ, αmin)−P cos 6(θ−Δθ, αmin)" is referred to as "P sin 6(n−1)−P cos 6(n−1)".

In the determination in the step S212, if it is determined that the absolute value of P sin 6(θ, αmin)−P cos 6(θ, αmin) is greater than the absolute value of P sin 6(θ−Δθ, αmin)−P cos 6 (θ−Δθ, αmin) (the step S212: No), a process operation in a step S214 described later is performed.

On the other hand, in the determination in the step S212, if it is determined that the absolute value of P sin 6(θ, αmin)−P cos 6(θ, αmin) is less than or equal to the absolute value of P sin 6(θ−Δθ, αmin)−P cos 6 (θ−Δθ, αmin) (the step S212: Yes), the arithmetic apparatus 120 stores the present θ as θmin (step S213).

Then, the arithmetic apparatus 120 determines whether or not θ is greater than or equal to "θc+θb" (step S214). In the determination, if it is determined that θ is less than "θc+θb" (the step S214: No), the process operation in the step S210 described above is performed. On the other hand, in the determination, if it is determined that θ is greater than or equal to "θc+θb" (the step S214: Yes), the process illustrated in FIG. 18 is ended.

Figure 20:
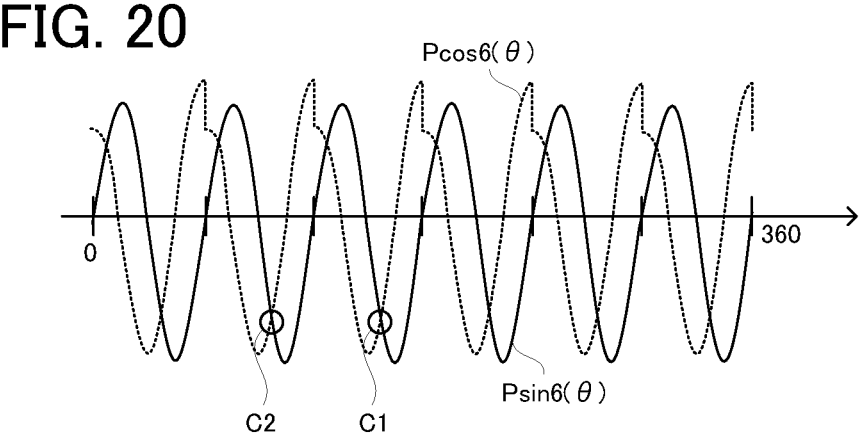
FIG. 20 is a diagram illustrating one example of waveforms of a sixth harmonic associated with three-phase power.

Here, the process operations in the steps S208 to S214 described above are, for example, process operations for searching for an intersection between a waveform associated with P sin 6(θ) and a waveform associated with P cos 6(θ) illustrated in FIG. 20. A value stored as θmin when the process illustrated in FIG. 18 is a phase indicating the intersection. Specifically, for example, in the U-phase voltage pulse in FIG. 13A, 162 degrees at which the high level and the low level are temporarily inverted corresponds to the phase of an intersection surrounded by a circle C1 in FIG. 20. Moreover, in the U-phase voltage pulse in FIG. 15B, 102 degrees at which the high level and the low level are temporarily inverted corresponds to the phase of an intersection surrounded by a circle C2 in FIG. 20.

(4) Pulse Width Calculation Process

The details of the process operation in the step S30 described above will be explained with reference to flowcharts in FIG. 21 and FIG. 22.

Figure 21:
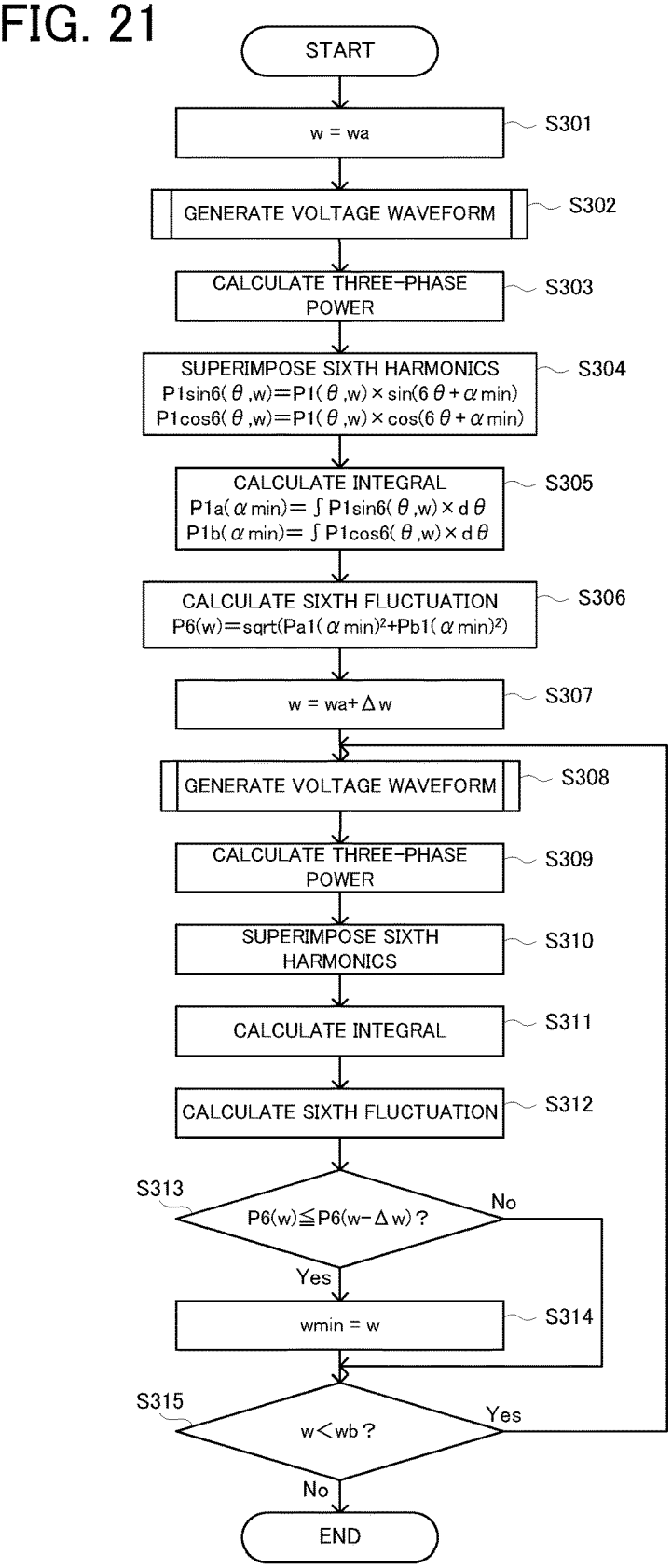
FIG. 21 is a flowchart illustrating a pulse width calculation process according to the fourth embodiment.

In FIG. 21, the arithmetic apparatus 120 sets a pulse width w to "wa", which is an initial value (step S301). Then, the arithmetic apparatus 120 generates the voltage waveform of the square wave voltage, on the basis of θmin and the pulse width w (step S302).

Here, the process operation in the step S302 will be explained with reference to the flowchart in FIG. 22. FIG. 22 illustrates a process of generating the voltage waveform of the U-phase voltage; however, the same process applies to V-phase voltage and W-phase voltage.

Figure 22:
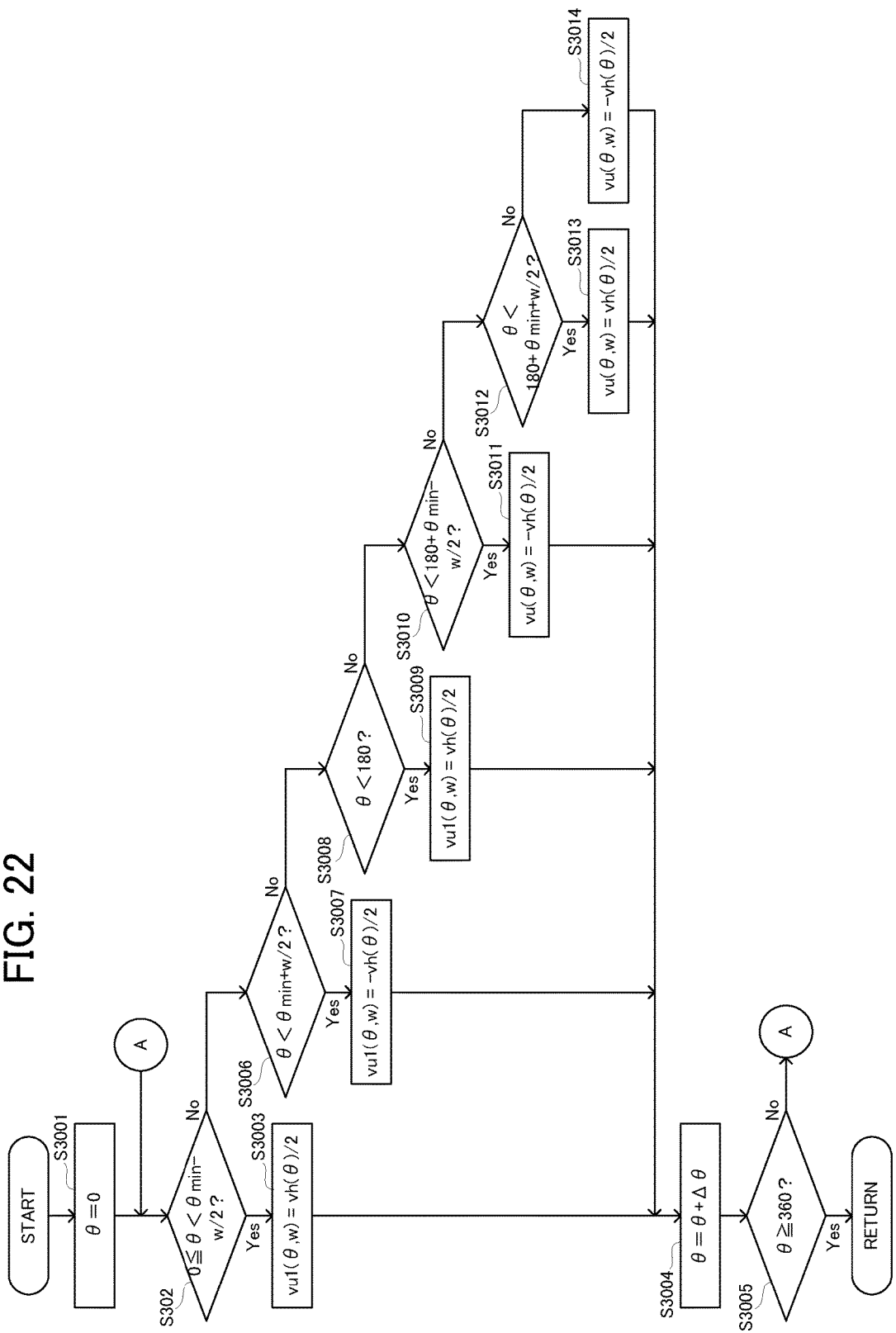
FIG. 22 is a flowchart illustrating a voltage waveform generation process according to the fourth embodiment.

In FIG. 22, the arithmetic apparatus 120 sets θ to "0", which is an initial value (step S3001). Then, the arithmetic apparatus 120 determines whether or not θ is greater than or equal to 0 and is less than "θmin−w/2" (step S3002). In the determination, if it is determined that θ is greater than or equal to 0 and is less than "θmin−w/2" (the step S3002: Yes), the arithmetic apparatus 120 sets U-phase voltage vu(θ, w) regarding the present θ and the present pulse width w, to "Vh(θ)/2" (step S3003). Here, "Vh(θ)" is a waveform of the input voltage of the inverter 21 obtained in the process operation in the step S101 in FIG. 18.

Then, the arithmetic apparatus 120 increases θ by Δθ (step S3004), and determines whether or not new θ is greater than or equal to 360 (step S3005). In the determination, if it is determined that θ is greater than or equal to 360 (the step S3005: Yes), the process illustrated in FIG. 22 is ended. On the other hand, in the determination in the step S3005, if it is determined that θ is less than 360 (the step S3005: No), the process operation in the step S3002 described above is performed.

In the determination in the step S3002, if it is determined that θ is greater than or equal to "θmin−w/2" (the step S3002: No), the arithmetic apparatus 120 determines whether or not θ is less than "θmin+w/2" (step S3006). In the determination, if it is determined that θ is less than "θmin+w/2" (the step S3006: Yes), the arithmetic apparatus 120 sets the U-phase voltage vu(θ, w) regarding the present θ and the present pulse width w, to "−Vh(θ)/2" (step S3007), and performs the process operation in the step S3004.

In the determination in the step S3006, if it is determined that θ is greater than or equal to "θmin+w/2" (the step S3006: No), the arithmetic apparatus 120 determines whether or not θ is less than "180" (step S3008). In the determination, if it is determined that θ is less than "180" (the step S3008: Yes), the arithmetic apparatus 120 sets the U-phase voltage vu(θ, w) regarding the present θ and the present pulse width w, to "Vh(θ)/2" (step S3009), and performs the process operation in the step S3004.

In the determination in the step S3008, if it is determined that θ is greater than or equal to "180" (the step S3008: No), the arithmetic apparatus 120 determines whether or not θ is less than "180+θmin−w/2" (step S3010). In the determination, if it is determined that θ is less than "180+θmin−w/2" (the step S3010: Yes), the arithmetic apparatus 120 sets the U-phase voltage vu(θ, w) regarding the present θ and the present pulse width w, to "−Vh(θ)/2" (step S3011), and performs the process operation in the step S3004.

In the determination in the step S3010, if it is determined that θ is greater than or equal to "180+θmin−w/2" (the step S3010: No), the arithmetic apparatus 120 determines whether or not θ is less than "180+θmin+w/2" (step S3012). In the determination, if it is determined that θ is less than "180+θmin+w/2" (the step S3012: Yes), the arithmetic apparatus 120 sets the U-phase voltage vu(θ, w) regarding the present θ and the present pulse width w, to "Vh(θ)/2" (step S3013), and performs the process operation in the step S3004.

In the determination in the step S3012, if it is determined that θ is greater than or equal to "180+θmin+w/2" (the step S3012: No), the arithmetic apparatus 120 sets the U-phase voltage vu(θ, w) regarding the present θ and the present pulse width w, to "−Vh(θ)/2" (step S3014), and performs the process operation in the step S3004.

Figure 23:
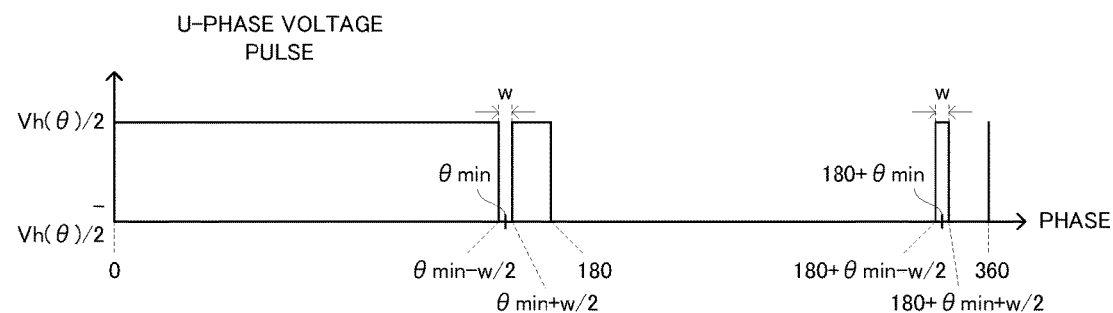
FIG. 23 is a diagram illustrating one example of a voltage waveform generated by the voltage waveform generation process according to the fourth embodiment.

As a result of the process illustrated in FIG. 22, for example, the voltage waveform of the square wave voltage as illustrated in FIG. 23 is generated.

Back in FIG. 21 again, the arithmetic apparatus 120 calculates the waveform associated with the three-phase power, on the basis of the voltage waveforms of the three phases generated in the process operation in the step S302 or the like (step S303). The waveform of the three-phase power regarding the pulse width w is set to "P1(θ, w)". In this process operation, for the current waveforms of the three phases, the current waveforms of the three phases obtained in the process operation in the step S101 in FIG. 18 may be used.

Then, the arithmetic apparatus 120 obtains "P1(θ, w)×sin (6θ+αmin)" as "P1 sin 6(θ, w)" (i.e. P1 sin 6(θ, w)=P1(θ, w)×sin(6θ+αmin)), on the basis of αmin obtained in the process illustrated in FIG. 19 and the waveform P1(θ, w). Moreover, the arithmetic apparatus 120 obtains "P1(θ, w)×cos(6θ+αmin)" as "P1 cos 6(θ, w)" (i.e. P1 cos 6(θ, w)=P1(θ, w)×cos(6θ+αmin)) (step S304).

An illustration of a waveform obtained by superimposing a waveform illustrated by P1 sin 6(θ, w) and a waveform illustrated by P1 cos 6(θ, w) is the same as in FIG. 20.

Then, the arithmetic apparatus 120 integrates P1 sin 6(θ, w) and P1 cos 6(θ, w) regarding θ between 0 and 360, and obtains P1a(αmin)(=∫P1 sin 6(θ, w)×dθ) and P1b(α)(=∫P1 cos 6(θ, w)×dθ) (step S305).

Then, the arithmetic apparatus 120 calculates a square root of a difference between squares of P1a(αmin) and squares of P1b(αmin), as a variation P6(w) of a sixth component of electrical frequency regarding the pulse width w, on the basis of P1a(αmin) and P1b(αmin) (step S306).

Then, the arithmetic apparatus 120 increases the pulse width w by Δw (step S307), and performs the same process operation as those in the steps S302 to S306 described above, as steps S308 to S312, regarding the pulse width w.

Then, the arithmetic apparatus 120 determines whether or not P6(w) currently obtained in the process operation in the step S312 is less than or equal to P6(w−Δw) obtained in the previous process (i.e. the process operation in the step S306, or the process operation in the step S312 previously performed), wherein the previous pulse width w is referred to as "w−Δw" for convenience, because the pulse width w is updated every time, as illustrated in the step S307 in FIG. 21 (step S313).

In the determination in the step S313, if it is determined that P6(w) is greater than P6(w−Δw) (the step S313: No), a process operation in a step S315 described later is performed. On the other hand, in the determination in the step S313, if it is determined that P6(w) is less than or equal to P6(w−Δw) (the step S313: Yes), the arithmetic apparatus 120 stores the present pulse width w as wmin (step S314).

Then, the arithmetic apparatus 120 determines whether or not the pulse width w is less than a constant wb (wb>wa) (step S315). In the determination, if it is determined that the pulse width w is less than the constant wb (the step S315: Yes), the process operation in the step S308 described above is performed. On the other hand, in the determination, if it is determined that the pulse width w is greater than or equal to the constant wb (the step S315: No), the process illustrated in FIG. 21 is ended.

(5) Pulse Pattern Determination Process

The details of the process operation in the step S40 described above will be explained with reference to a flowchart in FIG. 24. In FIG. 24, the waveform of the pulse pattern is set to "P1s(θ)". FIG. 24 illustrates a process of generating a pulse pattern associated with the U-phase voltage (i.e. the waveform of the U-phase voltage pulse); however, the same process applies to the V-phase voltage and the W-phase voltage.

In FIG. 24, the arithmetic apparatus 120 sets θ to "0", which is an initial value (step S401). Then, the arithmetic apparatus 120 determines whether or not θ is greater than "θmin−wmin/2" (step S402). In the determination, if it is determined that θ is less than or equal to "θmin−wmin/2" (the step S402; No), the arithmetic apparatus 120 sets a value of the waveform P1s(θ) regarding the present θ, to "1 (i.e. high level)" (step S403).

Then, the arithmetic apparatus 120 increases θ by Δθ (step S404), and determines whether or not new θ is greater than or equal to 360 (step S405). In the determination, if it is determined that θ is greater than or equal to 360 (the step S405: Yes), the process illustrated in FIG. 24 is ended. On the other hand, in the determination in the step S405, if it is determined that θ is less than 360 (the step S405: No), the process operation in the step S402 described above is performed.

In the determination in the step S402, if it is determined that θ is greater than "θmin−wmin/2" (the step S402; Yes), the arithmetic apparatus 120 determines whether or not θ is greater than "θmin+wmin/2" (step S406). In the determination, if it is determined that θ is less than or equal to "θmin+wmin/2" (the step S406: No), the arithmetic apparatus 120 sets the value of the waveform P1s(θ) regarding the present θ, to "0(i.e. low level)" (step S407), and performs the process operation in the step S404.

In the determination in the step S406, if it is determined that θ is greater than "θmin+wmin/2" (the step S406: Yes), the arithmetic apparatus 120 determines whether or not θ is greater than "180" (step S408). In the determination, if it is determined that θ is less than or equal to "180" (the step S408: No), the arithmetic apparatus 120 sets the value of the waveform P1s(θ) regarding the present θ to "1" (step S409), and performs the process operation in the step S404.

In the determination in the step S408, if it is determined that θ is greater than "180" (the step S408: Yes), the arithmetic apparatus 120 determines whether or not θ is greater than "180+0 min−wmin/2" (step S410). In the determination, if it is determined that θ is less than or equal to "180+θmin−wmin/2" (the step S410: No), the arithmetic apparatus 120 sets the value of the waveform P1s(θ) regarding the present θ to "0" (step S411), and performs the process operation in the step S404.

In the determination in the step S410, if it is determined that θ is greater than "180+θmin−wmin/2" (the step S410: Yes), the arithmetic apparatus 120 determines whether or not θ is greater than "180+θmin+wmin/2" (step S412). In the determination, if it is determined that θ is less than or equal to "180+θmin+wmin/2" (the step S412: No), the arithmetic apparatus 120 sets the value of the waveform P1s(θ) regarding the present θ to "1" (step S413), and performs the process operation in the step S404.

In the determination in the step S412, if it is determined that θ is greater than "180+θmin+wmin/2" (the step S412: Yes), the arithmetic apparatus 120 sets the value of the waveform P1s(θ) regarding the present θ to "0" (step S414), and performs the process operation in the step S404.

As a result of the process illustrated in FIG. 24, for example, the pulse pattern of the pulse waveform illustrated in FIG. 23 having standardized amplitude (i.e. having an amplitude of 1) is generated.

(Effects)

According to the motor control apparatus 1 in the fourth embodiment, the new pulse pattern can be obtained by the arithmetic process, which is extremely useful in practice. If the motor 11 is controlled in accordance with the obtained new pulse pattern, even if the operating point of the motor 11 is in the resonance region, the generation of the resonance in the booster circuit 22 can be avoided. In addition, in the fourth embodiment, the new pulse pattern is realized on the basis of the square wave control method. It is thus possible to improve the energy efficiency while suppressing the switching loss of the inverter 21, in comparison with the square wave PWM control method and the overmodulation PWM control method.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A motor control apparatus including: a booster circuit electrically connected to a battery; and an inverter electrically connected to the booster circuit at one end and electrically connected to a motor at another end, wherein
said motor control apparatus comprises a controller configured to control the inverter to output square wave voltage to the motor, thereby driving the motor, and
said controller is configured to control the inverter to temporarily invert voltage polarity associated with the square wave voltage at one or a plurality of rotation angles of said motor on the basis of a phase difference between a voltage command associated with the motor and an electric current associated with the motor in each of a first half period and a last half period of one period of the square wave voltage, on condition that an operating point of the motor is in a resonance region, which is an operation area in which resonance is generated in the booster circuit.

2. A motor control apparatus including: a booster circuit electrically connected to a battery; and an inverter electrically connected to the booster circuit at one end and electrically connected to a motor, which includes a three-phase coil, at another end, wherein
said motor control apparatus comprises a controller configured to control the inverter to output square wave voltage to the motor, thereby driving the motor,
said controller is configured to control the inverter to temporarily invert voltage polarity associated with the outputted square wave voltage in each of a first half period and a last period of one period of the outputted square wave voltage, and
said controller is configured to determine a voltage phase in which the voltage polarity associated with the outputted square wave voltage is to be temporarily inverted, and a voltage phase range in which the inversion is to be continued, on the basis of (i) a U-phase voltage waveform, a V-phase voltage waveform, and a W-phase voltage waveform, which are associated with the square wave voltage supplied to the motor, (ii) a U-phase current waveform, a V-phase current waveform, and a W-phase current waveform, which are associated with current supplied to the motor, and (iii) input voltage associated with the inverter.

3. The motor control apparatus according to claim 2, wherein said control is configured to (i) obtain a three-phase power waveform associated with three-phase power from the U-phase voltage waveform, the V-phase voltage waveform, the W-phase voltage waveform, the U-phase current waveform, the V-phase current waveform, and the W-phase current waveform, (ii) obtain a sixth component of frequency associated with the three-phase power from the three-phase power waveform, (iii) determine the voltage phase on the basis of the sixth component, and (iv) generate voltage waveforms of a U-phase, a V-phase, and a W-phase from the determined voltage phase and the input voltage, and determine the voltage phase range on the basis of the generated voltage waveform.

* * * * *